(12) United States Patent
Masuyama

(10) Patent No.: US 8,854,648 B2
(45) Date of Patent: Oct. 7, 2014

(54) PRINTING SYSTEM AND PRINTING CONTROL APPARATUS

(71) Applicant: Canon Kabushiki Kaisha, Tokyo (JP)

(72) Inventor: Yuka Masuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,682

(22) Filed: Dec. 5, 2013

(65) Prior Publication Data

US 2014/0160517 A1    Jun. 12, 2014

(30) Foreign Application Priority Data

Dec. 7, 2012  (JP) ................................. 2012-268361

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ............ *G06F 3/1221* (2013.01); *G06F 3/1259* (2013.01); *H04N 1/00896* (2013.01)
USPC ......................................... 358/1.13; 358/1.15

(58) Field of Classification Search
CPC .. G06F 3/1259; G06F 3/1221; H04N 1/00896
USPC ................ 358/1.1, 1.15, 1.13, 1.14
See application file for complete search history.

(56) References Cited

U.S. PATENT DOCUMENTS 7,302,195 B2 *  11/2007  Kobayashi ........................ 399/8
2012/0075651 A1 *  3/2012  Sasase ........................ 358/1.13

FOREIGN PATENT DOCUMENTS

JP        2009-287889 A    12/2009

* cited by examiner

*Primary Examiner* — Douglas Tran
(74) *Attorney, Agent, or Firm* — Canon U.S.A., Inc., IP Division

(57) ABSTRACT

A printing system includes a printing control apparatus including a reception unit that receives a print job transmitted from an external apparatus, a first storage unit that stores the print job, and a transmission unit that transmits the print job to a printing apparatus, and the printing apparatus including a reception unit that receives the print job, a printing unit that performs printing in accordance with the print job, and a notification unit that notifies the printing control apparatus that the printing is completed in a case where the printing unit completes the printing in accordance with the print job. The transmission unit transmits information indicating that the printing apparatus is permitted to be shifted to the power saving state upon reception of the printing completion notification. The printing apparatus further includes a control unit that shifts the printing apparatus to the power saving state upon reception of the information.

13 Claims, 18 Drawing Sheets

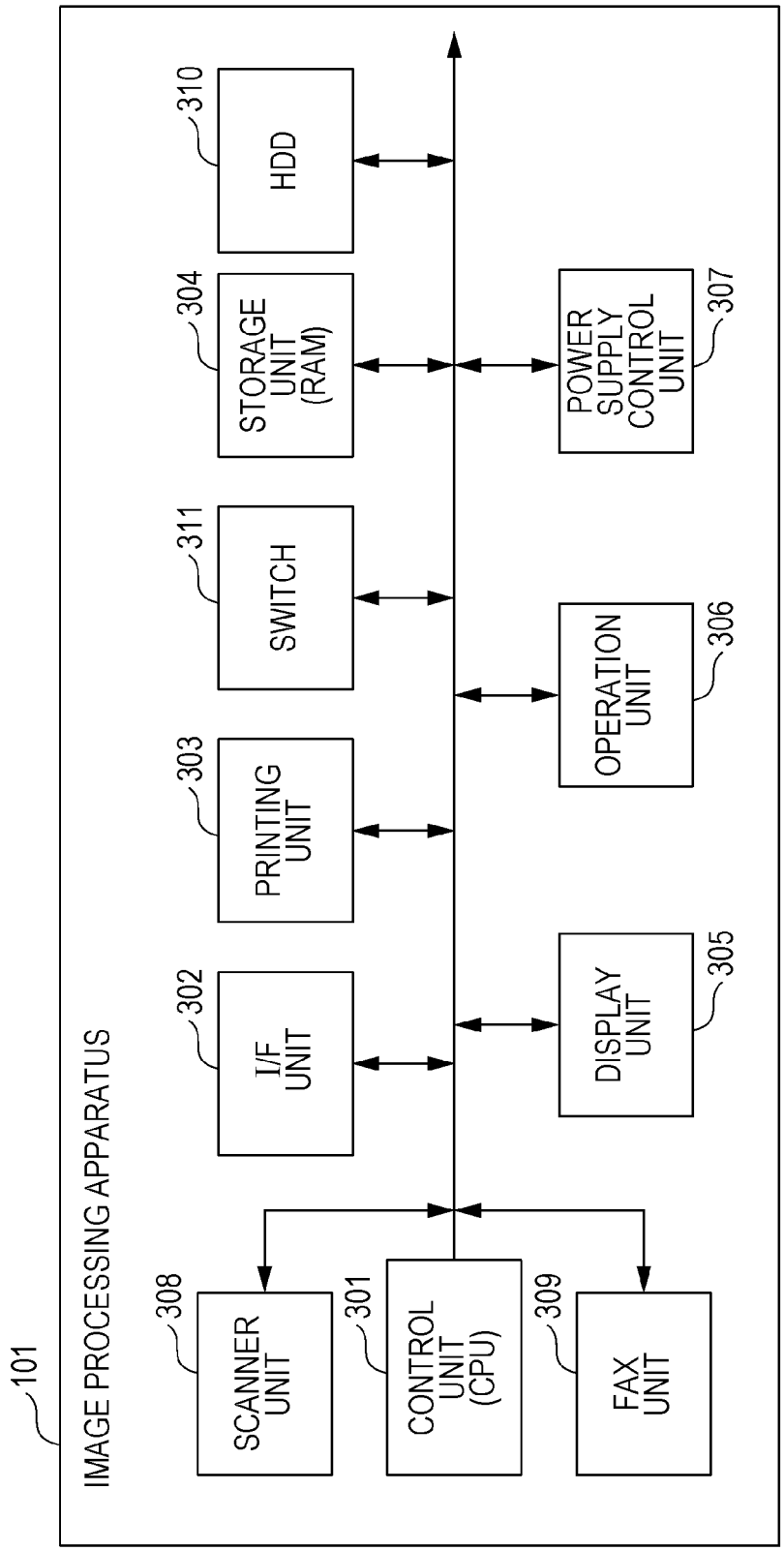

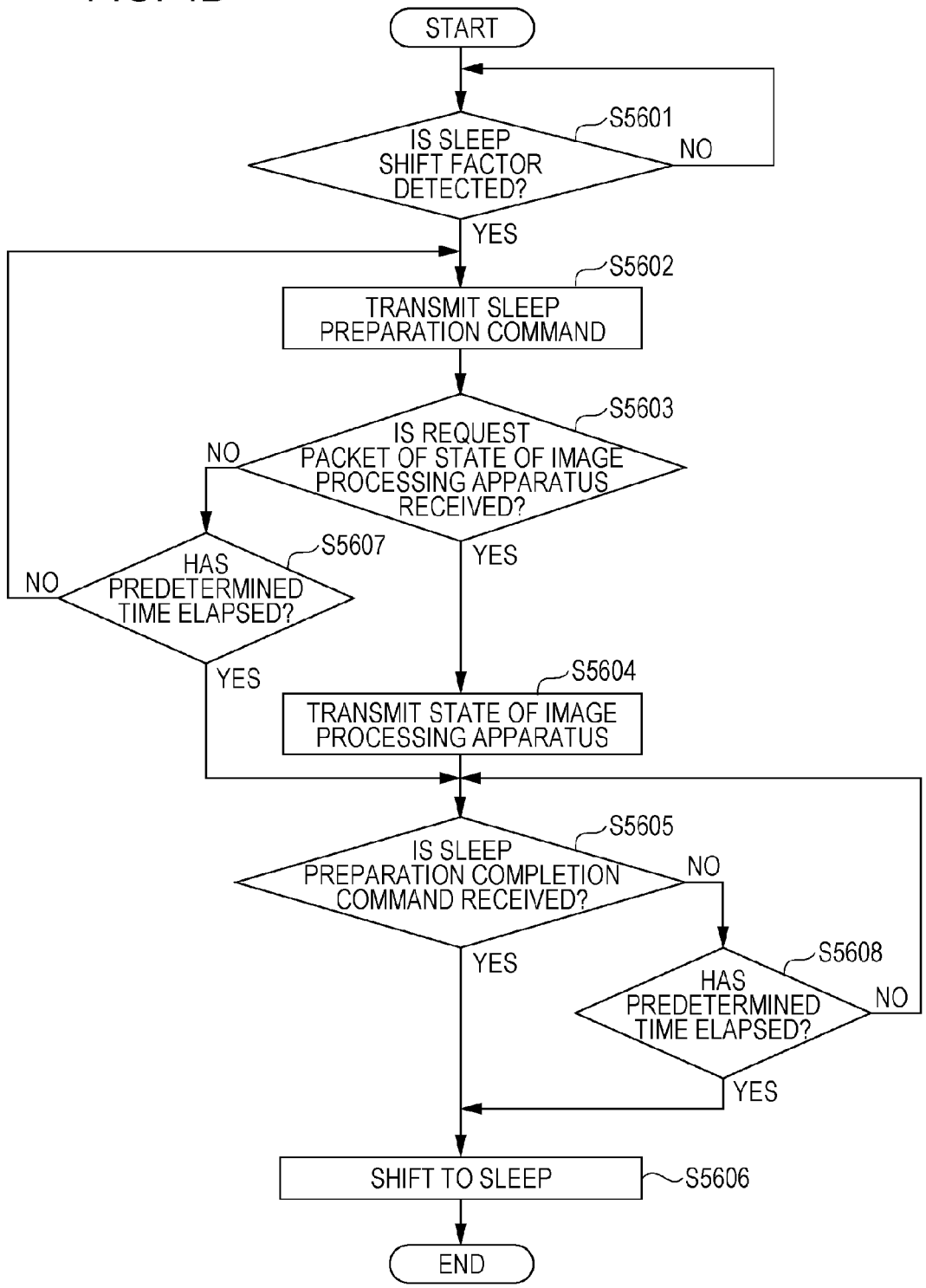

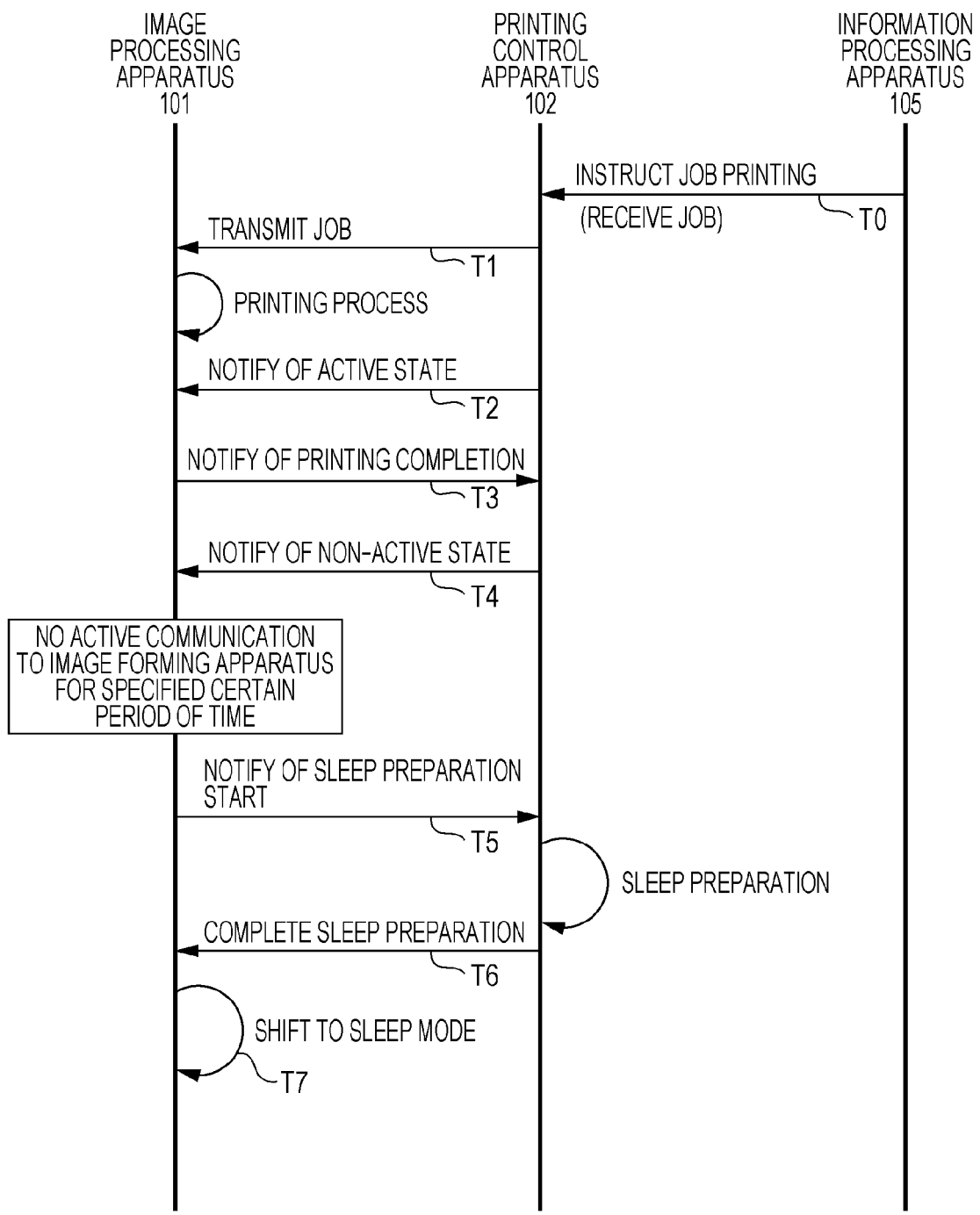

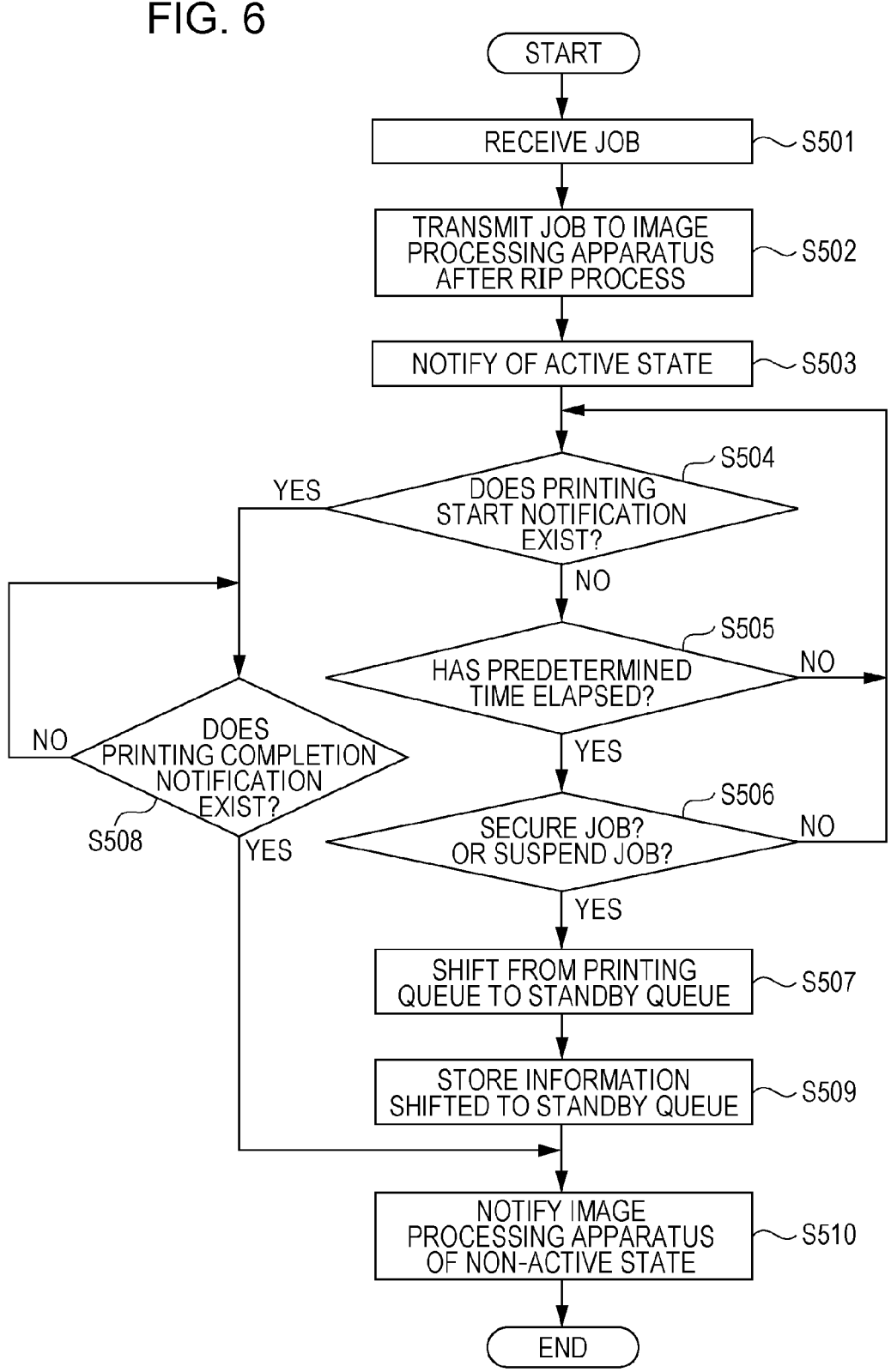

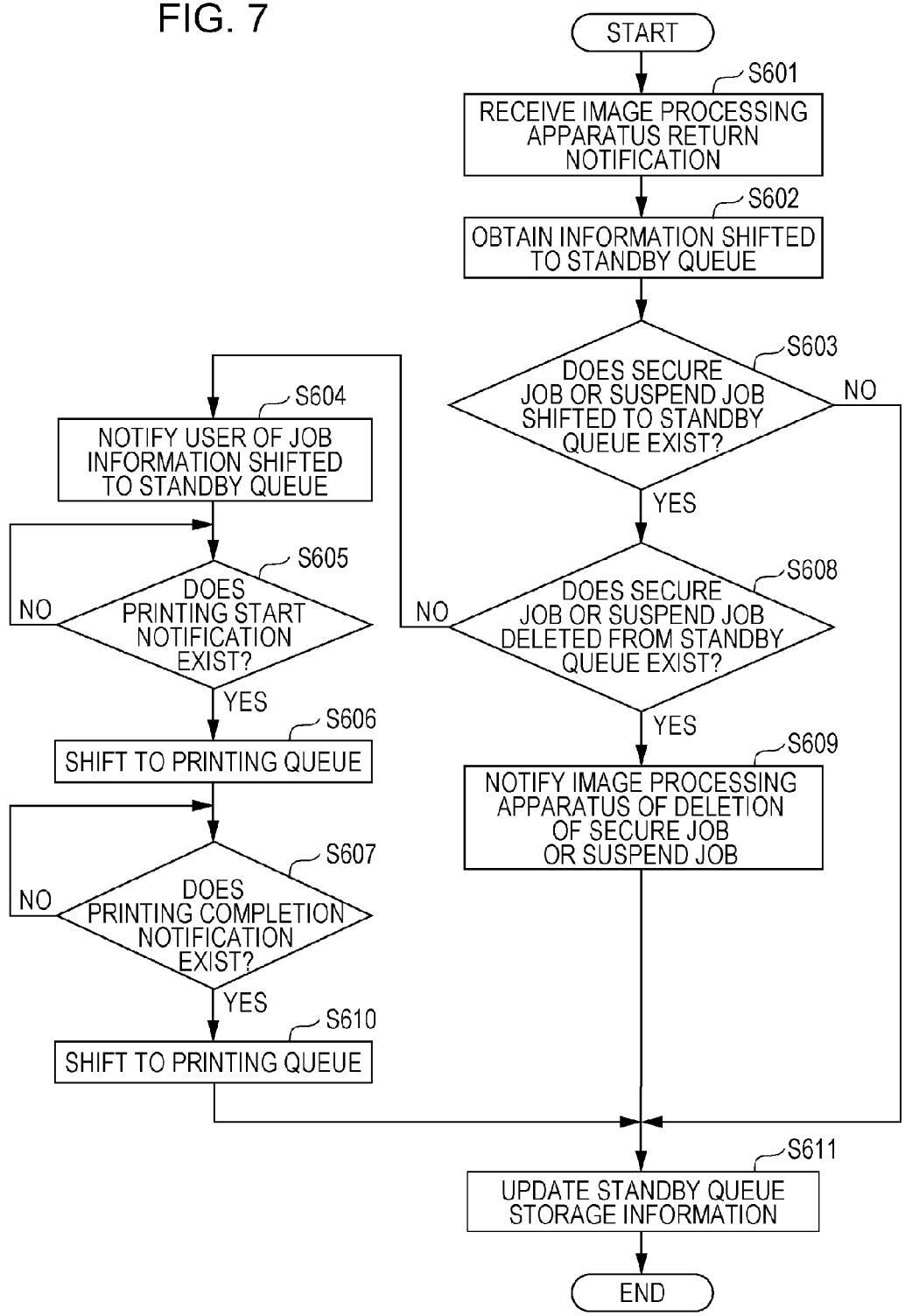

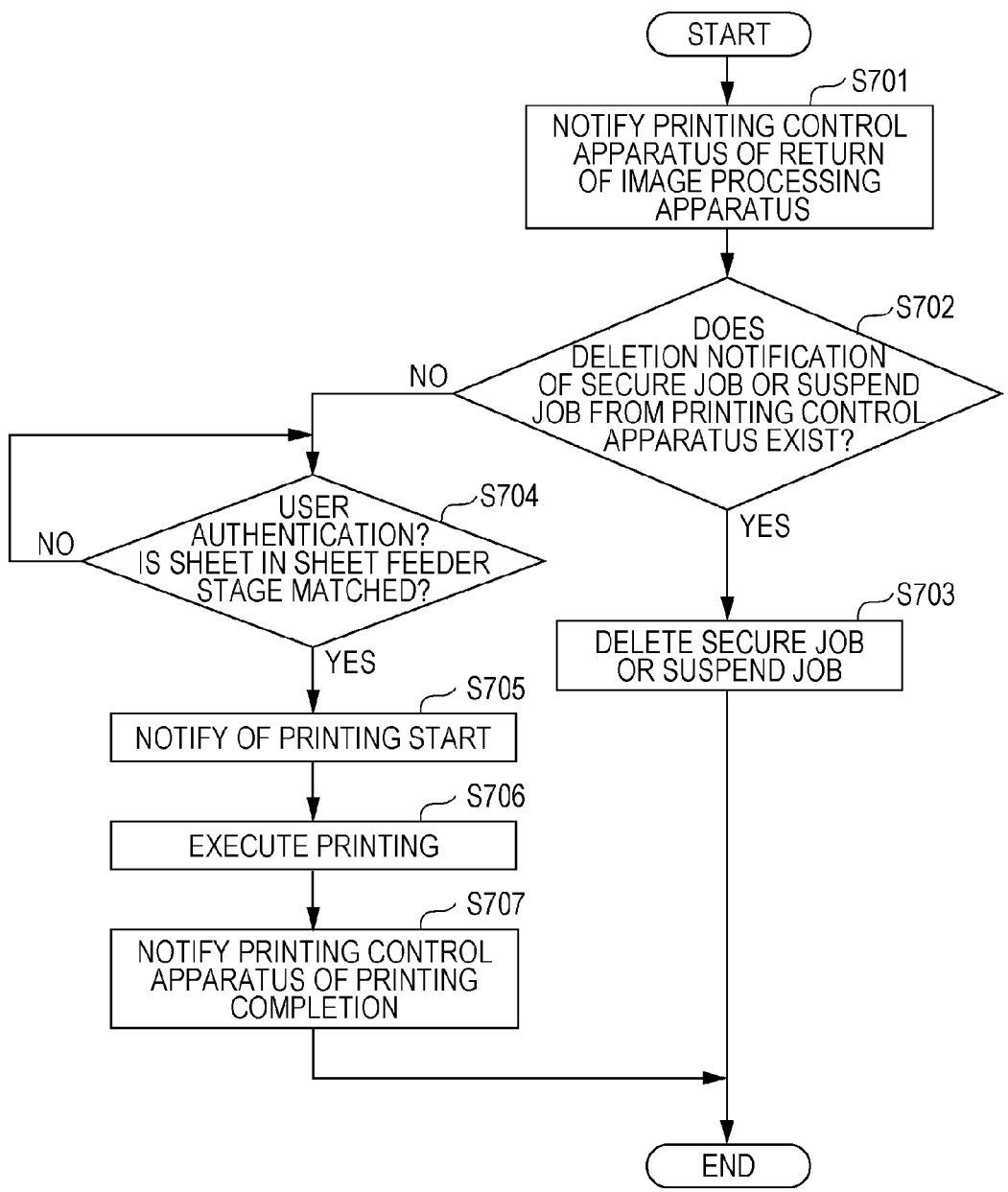

FIG. 10

```
            JOBS STORED IN STANDBY QUEUE
         AFTER PREDETERMINED TIME HAS ELAPSED

TIME STORED IN STANDBY QUEUE      JOB TYPE         JOB NAME
05/14/2012 14:25                  SECURE JOB       DEF.ps
05/14/2012 14:25                  SUSPEND JOB      ABC.pdf
```

FIG. 11

```
FOLLOWING JOBS ARE SHIFTED TO STANDBY QUEUE BEFORE SHIFTED
TO SLEEP MODE.
PLEASE CHECK STANDBY QUEUE.

-DEF_ps (WAITING FOR USER AUTHENTICATION)
 -ABC.pdf (MEDIA MISMATCH)

OK
```

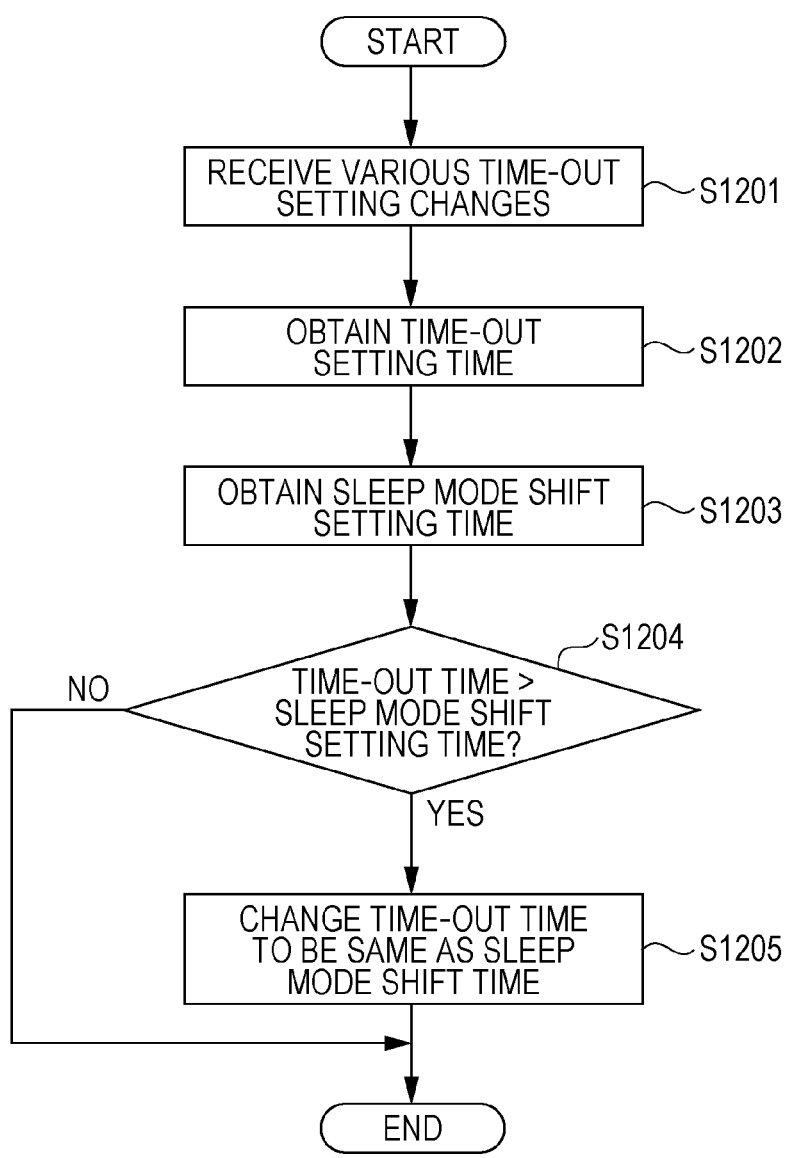

PRINTING SYSTEM AND PRINTING CONTROL APPARATUS

BACKGROUND OF THE INVENTION

1. Field of the Invention

The present invention relates to a printing system composed of a printing apparatus and a printing control apparatus.

2. Description of the Related Art

In recent years, a printing system (an image forming apparatus or a combination of the image forming apparatus and a printing control apparatus) having functions for realizing an improvement in efficiency of power consumption and power saving is demanded as efforts to deal with environmental issues. One of the functions is a sleep mode function. This sleep mode refers to a stop state in which power supply is stopped to an unused function in a case where an image forming apparatus does not have a communication from an external communication terminal for a certain period of time, and only minimal power is supplied while a printing execution and a display of an operation screen are stopped.

To effectively utilize this sleep mode function, according to a technology in related art (for example, see Japanese Patent Laid-Open No. 2009-287889), a technique of temporarily storing a print job having a low priority in another storage area is proposed. With this proposal, the following situation is avoided. That is, a print job having a low priority on the execution is intermittently executed, the return from the sleep mode frequently occurs, and as a result, a reduction in consumption power during the shift to the sleep state is not effective.

However, according to the technology in related art described in Japanese Patent Laid-Open No. 2009-287889, the image forming apparatus switches storage destinations of the job depending on the previously set priority of the job to minimize the intermittent execution but does not take a condition into account as to whether or not a job that is actually impeditive to the sleep itself exists.

The printing system composed of the image forming apparatus and the printing control apparatus is configured to detect the presence or absence of a job reception or a query from the printing control apparatus to which the image forming apparatus is connected and the other external communication terminals. As a result of the above-described detection, the image forming apparatus enters the sleep mode in a case where the communication with the external apparatus or the reception does not exist for a certain period of time. The image forming apparatus periodically receives a use state of the printing control apparatus to determine whether or not the image forming apparatus can enter the sleep mode. While the image forming apparatus receives the use state indicating that the printing control apparatus is in use (active state), the image forming apparatus is not shifted to the sleep mode. For example, after a job is input to the image forming apparatus, the printing control apparatus waits for a printing completion notification from the image forming apparatus and determines that the job is ended. For that reason, until the printing is completed, the printing control apparatus continues notifying the image forming apparatus that the printing control apparatus is in the active state.

A situation however occurs in which an effective transition to the sleep mode is not conducted in the above-described printing system according to the related art technology where a type of the job is not taken into account.

For example, in a case where printing is started only after a user authentication is conducted in the image forming apparatus like a secure job, the printing control apparatus determines that the image forming apparatus waits for the printing start in a state of waiting for the authentication, and a situation occurs in which the shift to the sleep mode is not conducted even when the image forming apparatus can enter the sleep mode.

Furthermore, in case of a job having a sheet feed waiting standby setting (suspend-on-mismatch setting), the job waiting for the sheet feed remains in a printing queue as a sheet feed waiting suspend job. For that reason, the printing control apparatus continues notifying the image forming apparatus of the active state until an appropriate sheet is fed and the suspend state is cancelled. As a result, the image forming apparatus is not shifted to the sleep mode even in a case where the sheet feed waiting state is continued.

SUMMARY OF THE INVENTION

The present invention has been made to solve the above-described problem and provides a mechanism in which even when a situation occurs in which a printing control apparatus is not notified that a job process is started to process a job of a particular type, the relevant job can normally be resumed, and also an image processing apparatus can promptly be shifted to a power saving state.

A printing system that can solve the problem according to an aspect of the present invention includes the following configuration. That is, there is provided a printing system including: a printing control apparatus configured to receive a print job transmitted from an external apparatus; and a printing apparatus configured to perform printing in accordance with the print job transmitted from the printing control apparatus, the printing control apparatus including a reception unit configured to receive the print job transmitted from the external apparatus, a first storage unit configured to store the print job received by the reception unit, and a transmission unit configured to transmit the print job stored in the first storage unit to the printing apparatus, the printing apparatus including a reception unit configured to receive the print job transmitted by the transmission unit, and a printing unit configured to perform printing in accordance with the print job received by the reception unit, and the printing apparatus including a notification unit configured to notify the printing control apparatus of a printing completion in a case where the printing unit completes the printing in accordance with the print job, in which the transmission unit transmits information indicating that the printing apparatus is permitted to be shifted to a power saving state in a case where the notification of the printing completion is received from the notification unit, and the printing apparatus further includes a control unit configured to shift the printing apparatus to the power saving state in a case where the information is received from the transmission unit.

According to another aspect of the present invention, there is provided a printing control apparatus that transmits a received print job to a printing apparatus, the printing control apparatus including: a transmission unit configured to transmit the received print job to the printing apparatus; a notification unit configured to notify the printing apparatus that the print job is in an active state until the print job transmitted by the transmission unit is executed in the printing apparatus; a reception unit configured to receive a printing completion notification transmitted from the printing apparatus in a case where the print job transmitted by the transmission unit is executed in the printing apparatus; and a control unit configured to perform a control to cause the notification unit to stop notifying the printing apparatus that the print job is in the active state (A) in a case where the reception unit receives the printing completion notification or (B) in a case where a predetermined time elapses while the reception unit does not receive the printing completion notification after the transmission unit transmits the print job to the printing apparatus.

Further features of the present invention will become apparent from the following description of exemplary embodiments with reference to the attached drawings.

BRIEF DESCRIPTION OF THE DRAWINGS

FIG. 3 is a block diagram of a basic configuration of an image forming apparatus illustrated in FIG. 1.

FIG. 4B is a flow chart for describing a control method for the image processing apparatus.

FIG. 5 is a flow chart for describing a sleep mode shift process of a printing system.

FIG. 6 is a flow chart illustrating the control method for the printing control apparatus.

FIG. 7 is a flow chart illustrating the control method for the printing control apparatus.

FIG. 8 is a flow chart illustrating a control method for the image forming apparatus.

FIG. 10 illustrates an example of list information of jobs shifted to a standby queue.

FIG. 11 illustrates an example of a UI screen displayed on the printing control apparatus.

FIG. 13 is a flow chart for describing the control method for the printing control apparatus.

DESCRIPTION OF THE EMBODIMENTS

Figure 1:
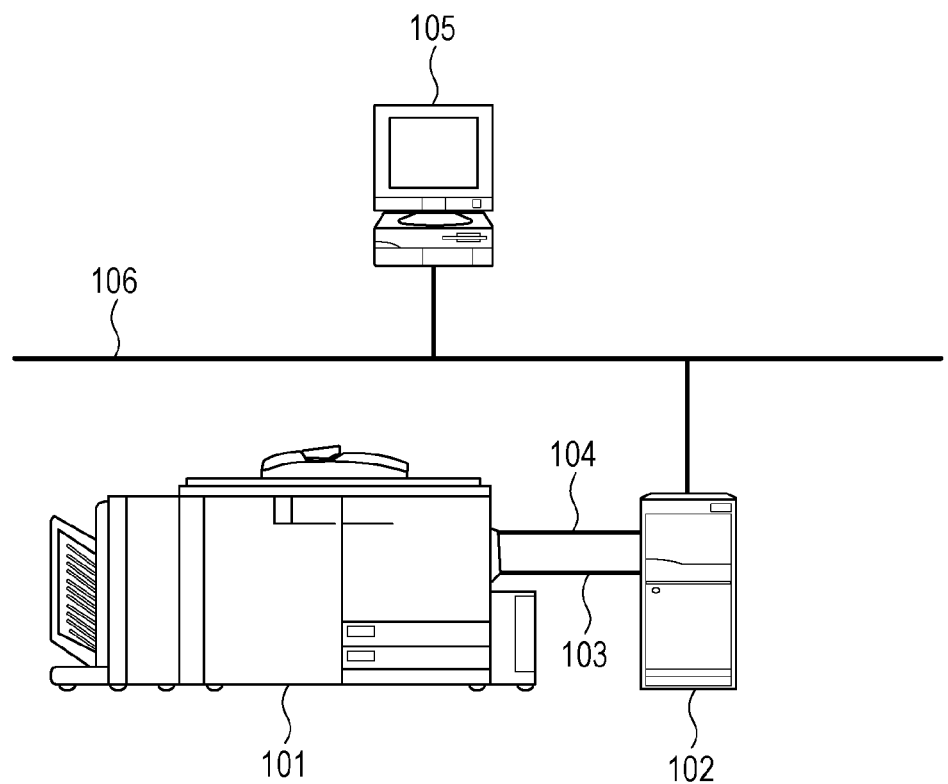
FIG. 1 is a block diagram of an example of a basic configuration of an image forming system.

Next, embodiments for carrying out the present invention will be described with reference to the drawings.
Description on a System Configuration First Embodiment FIG. 1 is a block diagram of an example of a basic configuration of an image forming system according to an embodiment of the present invention. The image forming system according to the present embodiment includes an image processing apparatus 101, a printing control apparatus 102, and an information processing apparatus 105. According to the present embodiment, a printing system where an image processing apparatus, a printing control apparatus, and an information processing apparatus are connected so as to be communicable to each other via a network is taken as an example. Here, the printing control apparatus 102 performs a control or the like to accept a job from the information processing apparatus 105 and transfer the job to the image processing apparatus 101. According to the present embodiment, a case of a multi function machine such as a multi function printer (MFP) will be described as an example of the image processing apparatus, but the image processing apparatus can also be applied to an image forming apparatus such as a printer.

In FIG. 1, the image processing apparatus 101, the printing control apparatus 102, and the information processing apparatus 105 are connected so as to be communicable to each other via a network 106 such as LAN or WAN. The image processing apparatus 101 is connected to the printing control apparatus 102 by an image transfer cable 104 and a network 103. The image processing apparatus 101 has various functions such as scanning, printing, and copying.

The printing control apparatus 102 receives a job via the network 106, performs an RIP process, and transmits image data to the image processing apparatus 101 via the image transfer cable 104. The printing control apparatus 102 and the image processing apparatus 101 also exchange a print command, a state notification, and the like with each other via the network 103. The printing control apparatus 102 can monitor situations of the connected image processing apparatus 101 and all the print jobs and also can perform pause of a print job, setting change, and printing resumption, as well as controls such as a duplication of a job, move, and deletion. The printing control apparatus 102 can be activated alone even when a power supply of the image processing apparatus 101 is off and can perform job reception, RIP process, job management, and the like. A power supply of the printing control apparatus 102 may be turned off depending on a setting in conjunction with the image processing apparatus 101.

The information processing apparatus 105 has functions of editing application files and performing print instructions. The information processing apparatus 105 also has assisting functions for the monitoring and the control on the image processing apparatus 101 managed in the printing control apparatus 102 and the print jobs. A user can confirm a job status and the like by using the information processing apparatus 105.

Figure 2:
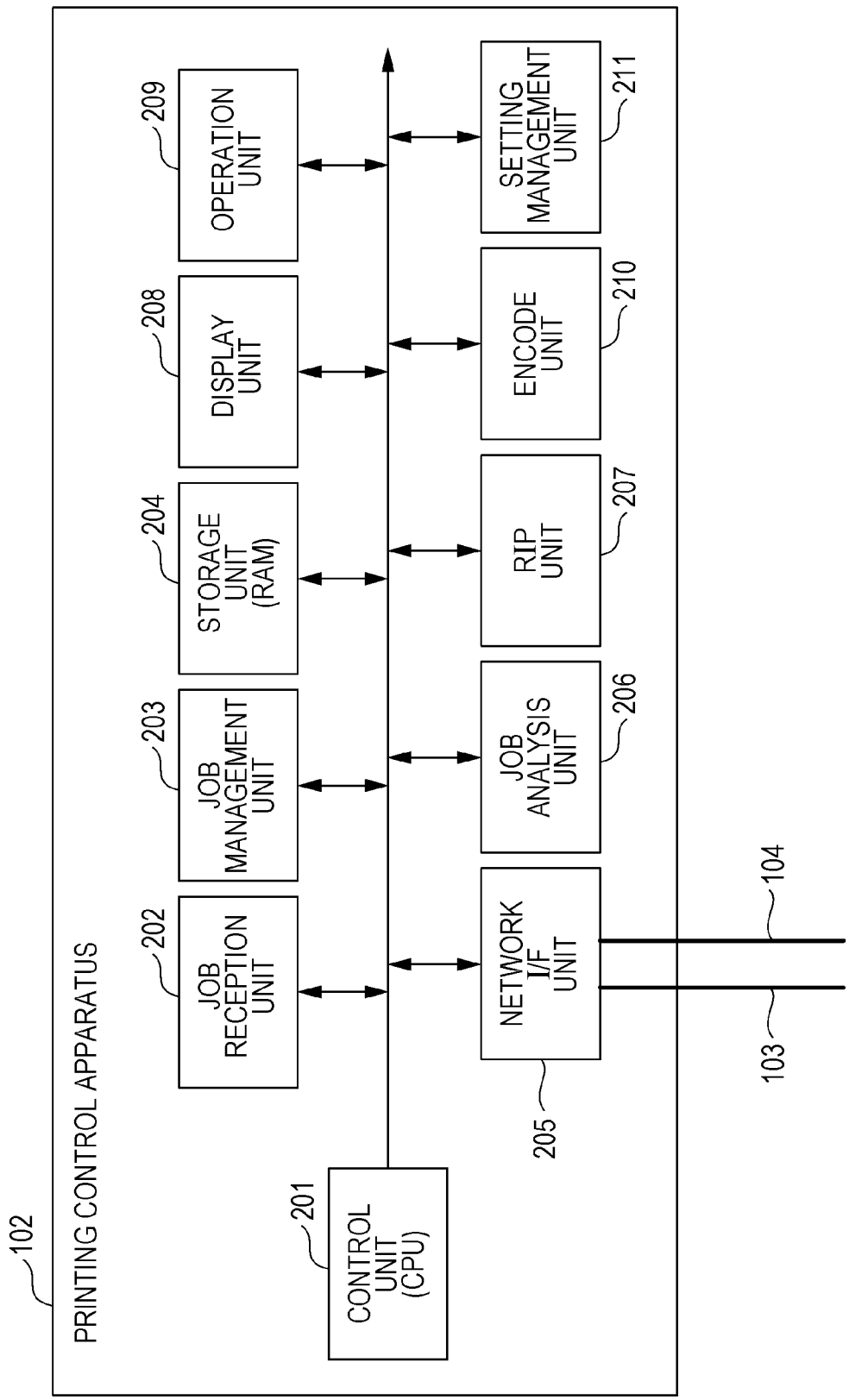
FIG. 2 is a block diagram of a basic configuration of a printing control apparatus illustrated in FIG. 1.

FIG. 2 is a block diagram of a basic configuration of the printing control apparatus 102 illustrated in FIG. 1.

In FIG. 2, a control unit (CPU) 201 of the printing control apparatus 102 controls the respective functions connected via a system bus and controls an entire operation of the printing control apparatus 102. The control unit 201 executes a program stored in a storage unit (RAM) 204 to control and execute the respective configurations of the printing control apparatus 102.

A job reception unit 202 receives a job that has been transmitted in response to a print instruction issued from the information processing apparatus 105 via a network I/F unit 205 and transmits the received job to a job analysis unit 206. The job analysis unit 206 analyzes a setting of the received job and a state of the received job. The job analysis unit 206 then transmits the job to an RIP unit 207 or the RAM 204 in accordance with a result of the analysis on the relevant job.

The RIP unit 207 applies a raster image processor (RIP) process to a received print language such as PDL analyzed in the job analysis unit 206 or a particular data format for raster imaging. An encode unit 210 converts the data after the raster image processor process into the print data or the data format in a format supported by the image processing apparatus 101.

The RAM 204 temporarily stores (spools) the received print data or temporarily stores the data after the RIP process conducted by the RIP unit 207. The RAM 204 stores a job in an appropriate queue in accordance with a state of the received job. These queues include a printing queue, the standby queue, and a printed queue. The job on which the printing process is instructed is stored in the printing queue, and the printing process is applied to the jobs in order of the input. The jobs before the RIP, during the RIP, and after the RIP on which standby is instructed are stored in the standby queue. The job is shifted from this standby queue to the printing queue by the instruction from the user, and the printing process can be started. With regard to the printed queue, as a result of the printing process, the cancelled job and the printed job where the printing has been completed are shifted from the printing queue to be stored in the printed queue. According to the present embodiment, the printing queue, the standby queue, and the printed queue are provided so as to store the received jobs while being associated with the job process states.

The RAM 204 also stores control information and setting information used for various purposes. A job management unit 203 performs a job manage on the jobs stored in the RAM 204 such as pause of the job, cancellation, reconfiguration of the job, deletion, duplication, and resumption in accordance with the instruction from the information processing apparatus 105.

The network I/F unit 205 transfers the print command and the image data to an I/F unit 302 of the image processing apparatus 101 (FIG. 3). A display unit 208 performs a display for conveying information to the user by way of an image and a character and a control used for the display. An operation unit 209 is an operation unit that includes a button, a key, a touch panel, and the like and is configured to perform an operation of the printing control apparatus 102. A setting management unit 211 manages various setting information such as the printing process that can be set by the printing control apparatus 102.

FIG. 3 is a block diagram of a basic configuration of the image processing apparatus 101 illustrated in FIG. 1.

In FIG. 3, a control unit (CPU) 301 configured to control the entirety of the image processing apparatus 101 executes a program stored in a storage unit 304, and the control is executed by controlling the respective configurations of the image processing apparatus 101. An operation unit 306 is used for the user when various inputs are carried out. The operation unit 306 includes a touch panel and a key and transmits the input information to the control unit 301.

A display unit 305 is used for various displays by way of the image and the character for the user. The display unit 305 controls a display of a touch panel unit, an LED, or the like. The I/F unit 302 receives the print command and the image data from the network I/F unit 205 of the printing control apparatus 102 and transmits the image data to a printing unit 303 while following the print command. The printing unit 303 performs the printing process of the image data that is subjected to the RIP by the RIP unit 207 of the printing control apparatus 102 and encoded by the encode unit 210. The storage unit 304 is composed of a non-volatile memory such as hard disc and stores image data generated by the respective processes, control information used for various purposes, and setting information. According to the present embodiment, it is also possible to configure the image processing apparatus as a multi function printer (MFP) through the addition of the respective function processes of a scanner unit, a finisher unit, a facsimile unit, and the like.

Hereinafter, a description will be given of a power saving control example in a printing system in which the image processing apparatus according to the present embodiment is connected to the printing control apparatus to communicate with the information processing apparatus 105.

Transition of the Power State of the Image Processing Apparatus

Figure 4A:
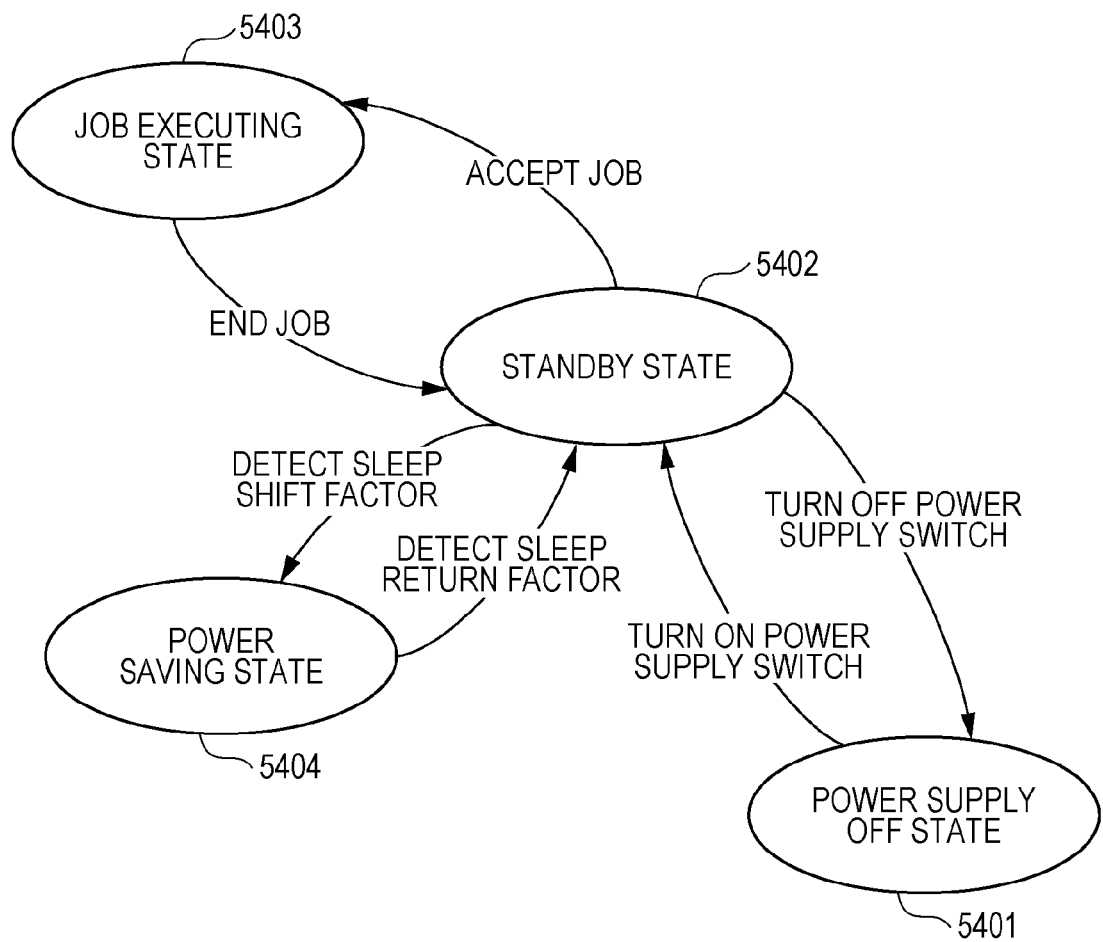
FIG. 4A illustrates a power saving state of an image processing apparatus.

FIG. 4A is a state transition diagram illustrating a transition of a power state of the image processing apparatus 101.

The image processing apparatus 101 according to the present embodiment has one of power states including a power supply off state 5401, a standby state (first power state) 5402, a job executing state 5403, and a power saving state (second power state) 5404. According to the present embodiment, the above-described four states are exemplified, and the present invention is not limited to this configuration. The image processing apparatus 101 may also have other power states.

For example, the image processing apparatus 101 may be a suspend state or a hibernation state. The suspend state refers to a state in which the image processing apparatus 101 can return to the standby state 5402 at a high speed. In this suspend state, the power distribution to the RAM 304 is maintained, and the image processing apparatus 101 uses the state of the image processing apparatus 101 stored in the RAM 304, so that the image processing apparatus 101 is activated to be in the standby state 5402. The hibernation state also refers to a state in which the image processing apparatus 101 can return to the standby state at a high speed. In this hibernation state, the power state is similar to the power supply off state 5401, and the power supplied to the individual units of the image processing apparatus 101 is stopped.

It is noted that a difference from the power supply off state 5401 resides in that the state of the image processing apparatus 101 is stored in the HDD 310 before the shift to the hibernation state. The image processing apparatus 101 returns at a high speed on the basis of the information stored in the HDD 310 from the hibernation state to the standby state.

The following relationship is established: an execution state 5403>the standby state 5402>the power saving state 5404>the power supply off state 5401.

The power supply off state 5401 refers to a state in which a switch 311 of the image processing apparatus 101 is off, and the power supply is stopped with respect to all the configurations of the image processing apparatus 101. When the user turns the switch 311 on in the power supply off state 5401, the state is transited to the standby state 5402.

The standby state 5402 refers to a state in which the image processing apparatus 101 stands by the execution of the job, and the power supply is conducted with respect to all the configurations of the image processing apparatus 101. The power supply may not be conducted with respect to all of the configurations among the configurations of the image processing apparatus 101 in the standby state 5402. The power may be supplied to the used configurations, and the power may not be supplied to the other configurations (for example, the operation unit 306 or the like). When the job is accepted from the information processing apparatus 105 via the printing control apparatus 102 in the standby state 5402, the image processing apparatus 101 is transited to the job executing state 5403. When a sleep shift factor exists in the standby state 5402, the image processing apparatus 101 is transited to the power saving state 5404.

The following states correspond to the sleep shift factor, for example:

Press of a sleep shift button (not illustrated) by the user;

Elapse of predetermined time while a print job, a scan job, or the like is not executed in the standby state 5402; and Elapse of predetermined time while an access from the information processing apparatus 105 to a remove UI of the image processing apparatus 101 is not conducted.

When the user turns the switch 311 off in the standby state 5402, a shutdown process is executed, and the image processing apparatus 101 is transited to the power supply off state 5401. The shutdown process refers to a process of ending an OS or application to shut down the image processing apparatus 101.

The job executing state 5403 refers to a state in which the image processing apparatus 101 executes the job, and the power supply is conducted with respect to all the configurations of the image processing apparatus 101. In the job executing state 5403 also, the power supply may not be conducted with respect to all the configurations among the configurations of the image processing apparatus 101. The power may be supplied to the used configurations, and the power may not be supplied to the other configurations (for example, the operation unit 306 or the like). The power supply may not be conducted with respect to units that are not used for the execution of the job. Specifically, in a case where the print job for printing an image on a sheet is executed, the power supply may be stopped with respect to the operation unit 306, the scanner unit 308, and the like which are not used for the execution of the print job. When the job is ended in the job executing state 5403, the state is transited to the standby state 5402.

The power saving state 5404 refers to a state in which the image processing apparatus 101 stands by in a power saving mode, and the power supply is conducted with respect to a part of the configurations including the network I/F 302 among the configurations of the image processing apparatus 101. In the power saving state 5404, the power supply is stopped with respect to the scanner unit 308, the printing unit 303, the operation unit 306, or the like. When a sleep return factor is accepted in the power saving state 5404, the state is transited to the standby state 5402. It is noted that the network I/F 302 can response to a simple packet transmitted via the network while being in the power saving state 5404. This function is referred to as proxy response. Packets such as Address Resolution Protocol (ARP) request, Simple Network Management Protocol (SNMP) state obtaining, and Internet Control Message Protocol (ICMP) neighborhood search are exemplified as the simple packet.

The following states correspond to the sleep return factor, for example:

Press of the sleep return button by the user; and

Acceptance of the job from the information processing apparatus 105.

Description on the Operation by the Image Processing Apparatus when the Image Processing Apparatus is Shifted to the Power Saving State FIG. 4B is a flow chart for the image processing apparatus 101 in a case where the image processing apparatus 101 is shifted to the power saving state 5404. Next, with reference to FIG. 4B, a description will be given of an operation by the image processing apparatus 101 in a case where the image processing apparatus 101 is shifted to the power saving state 5404. The flow chart illustrated in FIG. 4B is realized while the CPU 301 executes the program expanded into the RAM 304.

When the image processing apparatus 101 is shifted to the standby state 5402 after the image processing apparatus 101 has executed the job, for example, the CPU 301 determines whether or not the sleep shift factor exists (S5601). The CPU 301 repeatedly performs this determination until the sleep shift factor exists (S5601: No). When it is determined that the sleep shift factor exists (S5601: Yes), the CPU 301 transmits a sleep preparation command to the network I/F 302 (S5602). The sleep preparation command is a command for requesting the printing control apparatus 102 to stop periodically obtaining the information of the image processing apparatus 101 so that the image processing apparatus 101 is shifted to the power saving state 5404 (command for requesting to stop the periodic obtainment of the MIB of the image processing apparatus 101). The sleep preparation command is transmitted to the printing control apparatus 102 via the network 103 or the like (S5602).

The CPU 301 then determines whether or not an obtaining request packet of the state of the image processing apparatus 101 is received from the printing control apparatus 102 (S5603). In a case where the CPU 301 determines that the obtaining request packet is received (S5603: Yes), the CPU 301 generates a packet indicating the state of the image processing apparatus 101 and causes the network I/F 302 to transmit the generated packet (S5604).

After that, the CPU 301 determines whether or not a sleep preparation completion command is received from the printing control apparatus 102 as response information of the transmitted sleep preparation command (S5605). In response to the reception of the sleep preparation completion command (S5605: Yes), the CPU 301 shifts the image processing apparatus 101 from the standby state 5402 to the power saving state 5404 (S5606). Specifically, the CPU 301 instructs a power supply control unit 307 to turn off the relay. According to this, the relay is turned off, the power supply is stopped with respect to the printing unit 303 and a scanner unit 308. The CPU 301 executes a sleep shift process before the power supply is stopped by the power supply control unit 307. The image processing apparatus 101 saves the state immediately before the state is shifted to the power saving state 5404 in the RAM 304 through this sleep shift process.

When it is determined in S5603 that the obtaining request packet of the state of the image processing apparatus 101 is not received (S5603: No), the CPU 301 determines whether or not a predetermined time has elapsed after the sleep preparation command is transmitted (S5607). In a case where the predetermined time has not elapsed (S5607: No), the CPU 301 causes the network I/F 302 to transmit the sleep preparation command again (S5602). On the other hand, in a case where the predetermined time has elapsed (S5607: Yes), the state of the image processing apparatus 101 is not transmitted, and the flow proceeds to S5605.

Even in a case where the CPU 301 determines in S5605 that the sleep preparation completion command is not received (S5605: No), the sleep shift process is conducted when the predetermined time has elapsed (S5606).

Figure 4C:
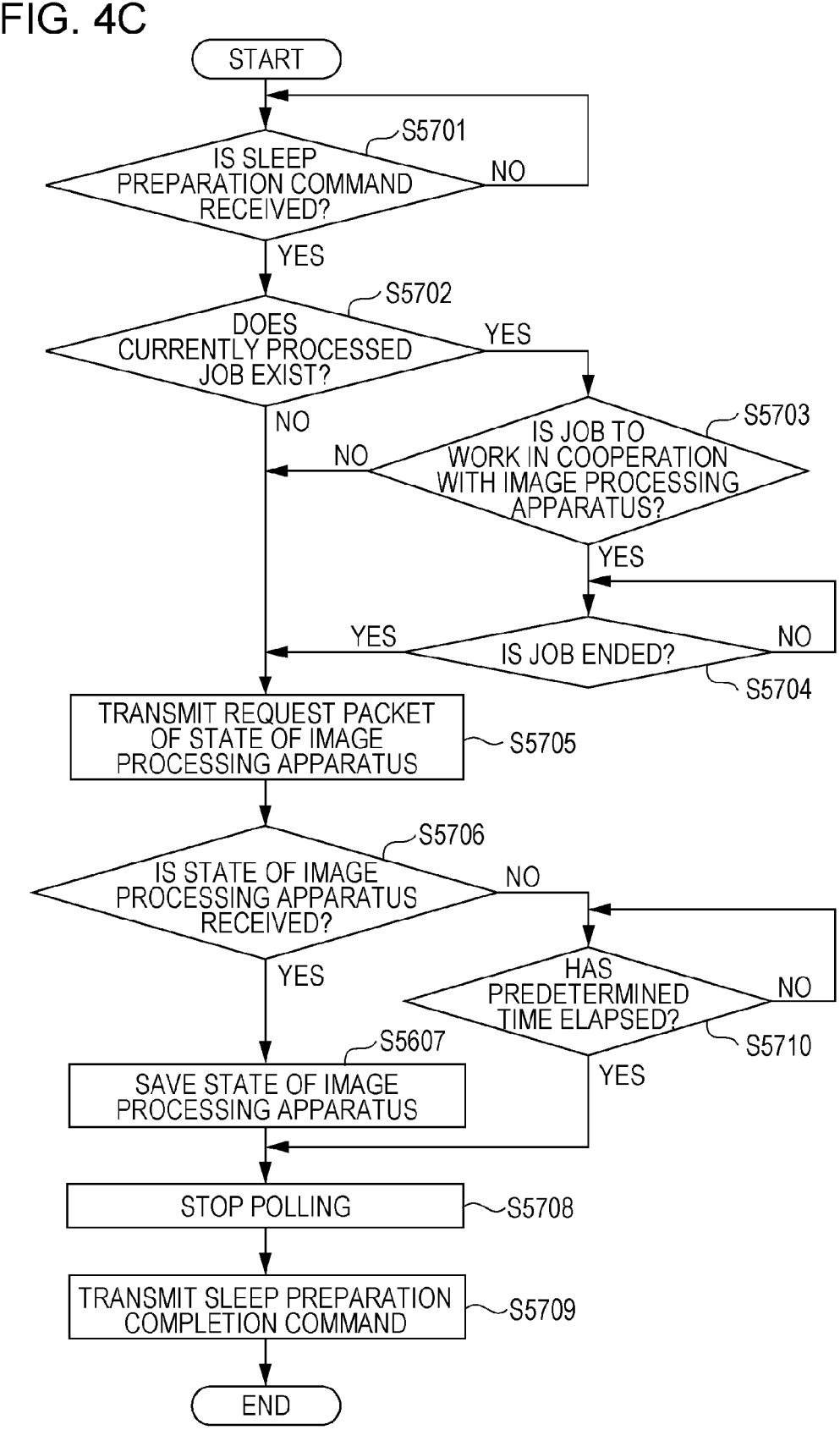
FIG. 4C is a flow chart for describing a control method for the printing control apparatus.

Description on an Operation by the Printing Control Apparatus when the Image Processing Apparatus is Shifted to the Power Saving State FIG. 4C is a flow chart for the printing control apparatus 102 in a case where the image processing apparatus 101 is shifted to the power saving state 5404. Next, with reference to FIG. 4C, a description will be given of an operation by the printing control apparatus 102 in a case where the image processing apparatus 101 is shifted to the power saving state

5404. The flow chart illustrated in FIG. 4C is realized while the CPU 201 executes the program expanded into the RAM 204.

First, the CPU 201 determines whether or not the sleep preparation command transmitted from the image processing apparatus 101 is received (S5701). The CPU 201 repeatedly performs this determination until the sleep preparation command is received (S5701: No). When it is determined that the sleep preparation command is received (S5701: Yes), the CPU 201 determines whether or not the currently processed job exists (S5702). When it is determined that the currently processed job exists (S5702: Yes), the CPU 201 confirms the type of the currently processed job (S5703). In this S5703, the CPU 201 determines whether or not the type of the currently processed job is a job working in cooperation with the image processing apparatus 101. The job working in cooperation with the image processing apparatus 101 includes a print job, a scan job, or the like. The job stored in the box (the HDD 310) of the image processing apparatus 101 where the printing is not executed is a job working in cooperation with the image processing apparatus 101.

On the other hand, a job that does not work in cooperation with the image processing apparatus 101 is a hold job or the like in which only the RIP process is conducted in the printing control apparatus 102. When it is determined that the type of the currently processed job is the job working in cooperation with the image processing apparatus 101 (S5703: Yes), the CPU 201 determines whether or not the currently processed job is ended (S5704). Here, the CPU 201 repeatedly performs this determination until the currently processed job is ended (S5704: No). When the currently processed job is ended (S5704: Yes), the CPU 201 executes the process in S5705. In a case where the currently processed job is a print job where the RIP process is conducted in the printing control apparatus 102 and also the printing control apparatus 102 performs a transmission to the image processing apparatus 101, the CPU 201 performs a control in the following manner. The CPU 201 determines that the currently processed job has ended when the RIP process is ended in the printing control apparatus 102. When the sleep preparation command is received before the printing control apparatus 102 transmits the image data on which the RIP process has been conducted to the image processing apparatus 101, the printing control apparatus 102 then executes the process up to the RIP process. However, the image data on which the RIP process has been conducted is not transmitted to the image processing apparatus 101. When the sleep preparation command is received after the printing control apparatus 102 starts transmitting the image data on which the RIP process has been conducted to the image processing apparatus 101, the printing control apparatus 102 does not interrupt the transmission of the image data on which the RIP process has been conducted. After the transmission of the image data on which the RIP process has been conducted is completed, the process in S5705 is executed.

When it is determined in S5703 that the type of the currently processed job is a job that does not work in cooperation with the image processing apparatus 101 (S5703: No), the process in S5705 is executed. When it is determined in S5702 that the currently processed job does not exist (S5702: No), the CPU 201 executes the process in S5705.

Subsequently, in S5705, the CPU 201 causes the network I/F unit 205 to transmit a device state request packet to obtain the state of the image processing apparatus 101 (S5705). The CPU 201 determines whether or not a packet indicating the state of the image processing apparatus 101 is received from the image processing apparatus 101 (S5706). When it is determined that the packet indicating the state of the image processing apparatus 101 is received (S5706: Yes), the state of the image processing apparatus 101 is saved in the RAM 204 or the HDD 310 (S5707). The RAM 204 or the HDD 310 stores sheet information of a sheet tray (the sheet type, the size, or the remaining number of sheets) or the like as the state of the image processing apparatus 101. The CPU 201 then controls the network I/F unit 205 so that the printing control apparatus 102 stops periodically obtaining the information of the image processing apparatus 101 (S5708). Specifically, the CPU 201 controls the network I/F unit 205 so that the printing control apparatus 102 stops periodically obtaining Management Information Base (MIB) of the image processing apparatus 101 (for example, at a 60-second interval) by way of polling. Specifically, the CPU 201 stops the obtainment of Sheet feeder stage information (sheet type, sheet size)

Remaining sheet amount

Remaining toner amount

Location (installment location)

Sheet discharge information (output bin, the presence or absence of sheet, full load).

According to the present embodiment, the printing control apparatus 102 may stop obtaining all the MIBs of the image processing apparatus 101 or may also stop obtaining a part of the MIBs. The image processing apparatus 101 according to the present embodiment can respond with respect to the obtainment of the part of the MIBs from the printing control apparatus 102 without returning from the power saving state 5404 to the standby state 5402 (this function is set as the acting response). In this acting response, the network I/F 302 of the image processing apparatus 101 responds to a query from the printing control apparatus 102. For this reason, according to the present embodiment, the obtainment of the part of the MIBs that can be subjected to the acting response by the image processing apparatus 101 is continued while the printing control apparatus 102 does not stop the obtainment of all the MIBs.

Subsequently, after the communication between the image processing apparatus 101 and the printing control apparatus 102 is stopped, the CPU 201 causes the network I/F unit 205 to transmit the sleep preparation completion command (S5709). The image processing apparatus 101 is shifted from the standby state 5402 to the power saving state 5404 in a case where the sleep preparation completion command is received.

In S5706, during a period until a predetermined time has elapsed after the CPU 201 transmits the device state request packet, if a packet indicating the state of the image processing apparatus 101 is not obtained (S5710), the flow proceeds to S5708. At this time, the CPU 201 does not save the state immediately before the image processing apparatus 101 is shifted to the power saving state 5404.

Next, a description will be given of operations by the image processing apparatus 101 and the printing control apparatus 102 in a case where the image processing apparatus 101 returns from the power saving state 5404 to the standby state 5402.

In an image forming system 100, with a trigger on a side of the image processing apparatus 101 or a trigger on a side of the printing control apparatus 102, the image processing apparatus 101 returns from the power saving state 5404 to the standby state 5402.

Figure 4D:
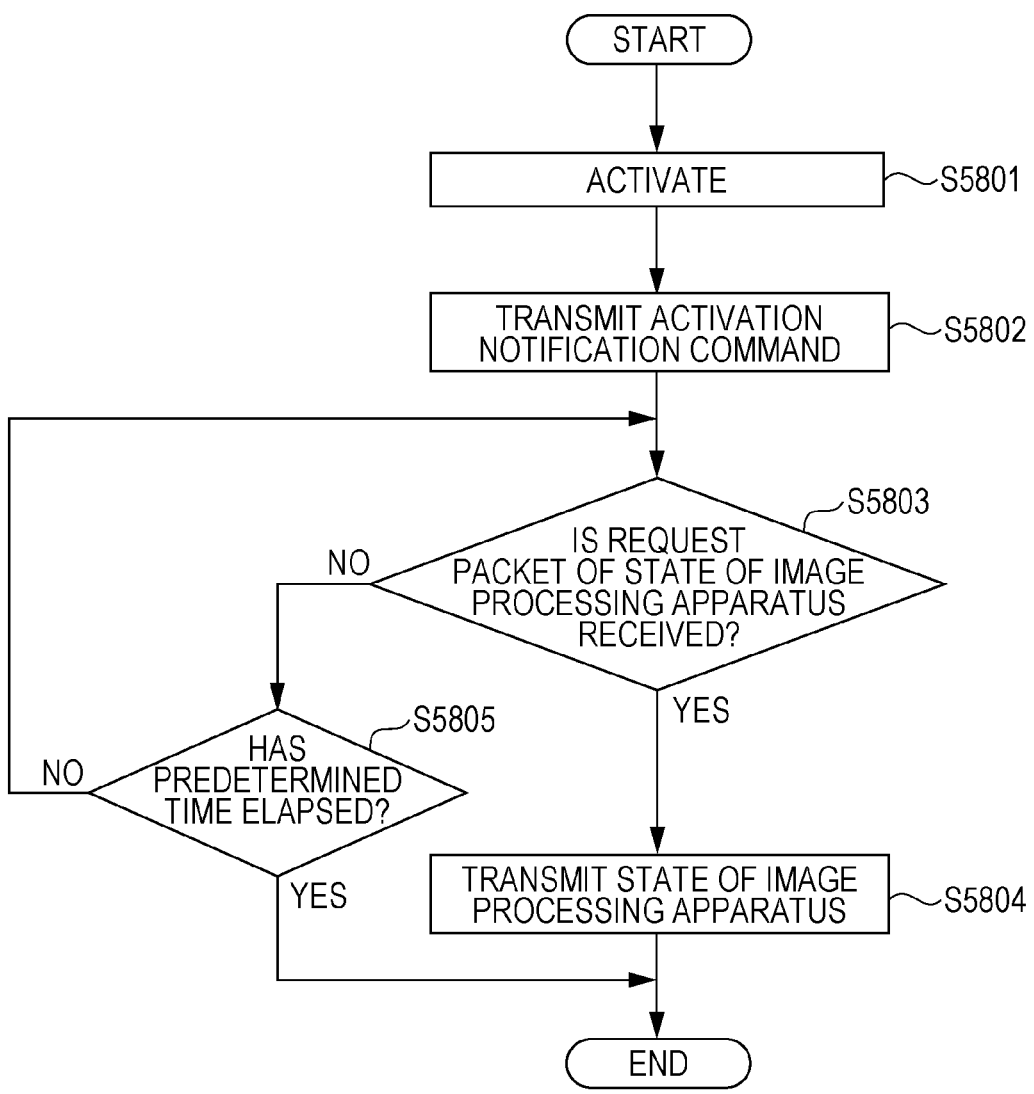
FIG. 4D is a flow chart for describing the control method for the image processing apparatus.

Operation by the Image Processing Apparatus in a Case where the Sleep Return Factor is Detected on the Image Processing Apparatus Side FIG. 4D is a flow chart illustrating an operation by the image processing apparatus 101 in a case where the sleep return factor is detected on the image processing apparatus 101 side. Next, with reference to FIG. 4D, the operation by the image processing apparatus 101 in a case where the image processing apparatus 101 is shifted from the power saving state 5404 to the standby state 5402 will be described.

In a case where the sleep return factor (for example, the user presses the sleep return button, a job is received from the information processing apparatus 105, a fax is received from an external device, or the like) in the image processing apparatus 101 that is shifted to the power saving state 5404, the power supply control unit 307 turns on a relay that is not illustrated in the drawing to supply the power to the CPU 301 and the like. According to this, the image processing apparatus 101 returns from the power saving state 5404 to the standby state 5402. The CPU 301 that has been supplied with the power executes the process while following the flow chart of FIG. 4D by executing the program expanded into the RAM 304.

The CPU 301 that has been supplied with the power first performs an activation process (S5801). In this activation process, the image processing apparatus 101 is put back in a state before being shifted to the power saving state 5404 by using the state of the image processing apparatus 101 saved in the RAM 304. The CPU 301 then causes the network I/F 302 to transmit an activation notification command (S5802). After that, the CPU 301 determines whether or not the obtaining request packet of the state of the image processing apparatus 101 is received from the printing control apparatus 102 (S5803). When the CPU 301 determines that the obtaining request packet is received (S5803: Yes), the CPU 301 generates a packet indicating the state of the image processing apparatus 101 and causes the network I/F 302 to transmit the generated packet (S5804).

When it is determined in S5803 that the obtaining request packet of the state of the image processing apparatus 101 is not received (S5803: No), the CPU 301 determines whether or not the predetermined time has elapsed after the activation notification command is transmitted (S5805). The CPU 301 stands by for a predetermined time until the obtaining request packet of the state of the image processing apparatus 101 is received (S5805). In a case where the CPU 301 does not receive the obtaining request packet even when the CPU 301 stands by for the predetermined time (S5805: Yes), the process is ended without transmitting the state of the image processing apparatus 101.

Figure 4E:
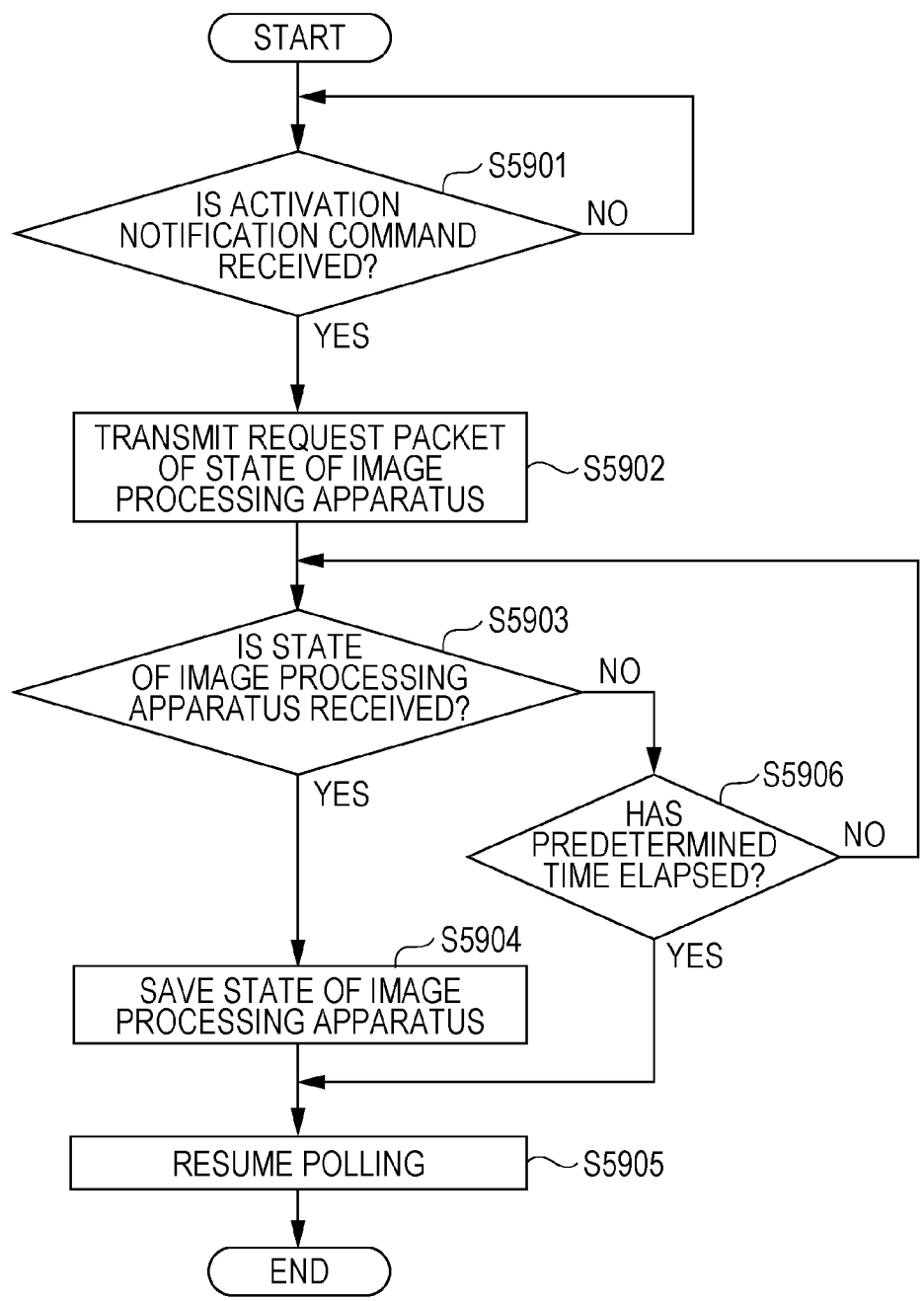
FIG. 4E is a flow chart for describing the control method for the printing control apparatus.

Operation by the Printing Control Apparatus in a Case where the Sleep Return Factor is Detected on the Image Processing Apparatus Side FIG. 4E is a flow chart illustrating an operation by the printing control apparatus 102 in a case where the image processing apparatus 101 returns from the power saving state 5404 to the standby state 5402. Next, with reference to FIG. 4E, the operation by the printing control apparatus 102 in a case where the image processing apparatus 101 is shifted from the power saving state 5404 to the standby state 5402 will be described. The flow chart illustrated in FIG. 4E is realized while the CPU 201 executes the program expanded into the RAM 204.

First, the CPU 201 determines whether or not the activation notification command transmitted from the image processing apparatus 101 is received (S5901). In a case where the CPU 201 determines that the activation notification command is received (S5901: Yes), the CPU 201 causes the network I/F unit 205 to transmit the device state request packet to obtain the state of the image processing apparatus 101 (S5902). The CPU 201 determines whether or not the packet indicating the state of the image processing apparatus 101 is received from the image processing apparatus 101 (S5903). When it is determined that the packet indicating the state of the image processing apparatus 101 is received (S5903: Yes), the state of the image processing apparatus 101 is saved in the RAM 204 or the HDD 310 (S5904). The RAM 204 or the HDD 310 stores the sheet information of the sheet tray (the sheet type, the size, or the remaining number of sheets) or the like as the state of the image processing apparatus 101 immediately after returning to the power saving state 5404. Next, the CPU 201 controls the network I/F unit 205 so that the communication between the printing control apparatus 102 and the image processing apparatus 101 is resumed (S5905). Specifically, the printing control apparatus 102 controls the network I/F unit 205 so that the CPU 201 periodically (for example, a 60-second interval) obtains the MIB (Management Information Base) of the image processing apparatus 101 by way of polling.

In S5906, in a case where the CPU 201 does not obtain the packet indicating the state of the image processing apparatus 101 during a period until the predetermined time has elapsed after the device state request packet is transmitted (S5906), the flow proceeds to S5905. At this time, the CPU 201 does not save the state immediately after the image processing apparatus 101 returns from the power saving state 5404.

Figure 4F:
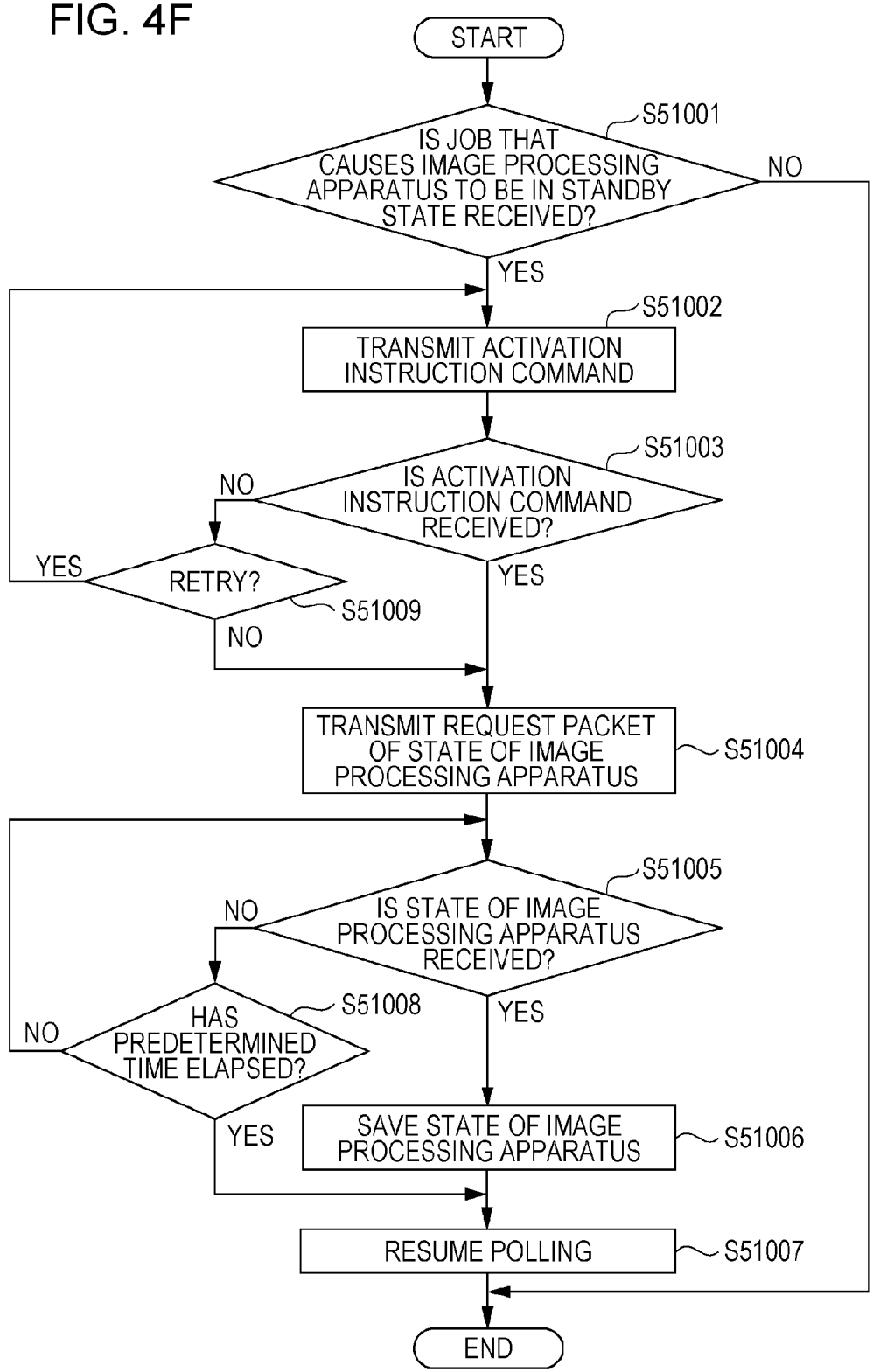
FIG. 4F is a flow chart for describing the control method for the printing control apparatus.

Operation by the Printing Control Apparatus in a Case where the Sleep Return Factor Exists on the Printing Control Apparatus Side FIG. 4F is a flow chart for the printing control apparatus 102 in a case where the image processing apparatus 101 is caused to have the sleep return from the printing control apparatus 102 side. With reference to FIG. 4F, a description will be given of the operation by the printing control apparatus 102 in a case where the image processing apparatus 101 is caused to return from the power saving state 5404 to the standby state 5402 from the printing control apparatus 102 side. The flow chart illustrated in FIG. 4F is realized while the CPU 201 executes the program expanded into the RAM 204.

According to the present embodiment, the image processing apparatus 101 is shifted from the power saving state 5404 to the standby state 5402 in a case, for example, where the print job is transmitted from the information processing apparatus 105 to the printing control apparatus 102.

When the CPU 201 of the printing control apparatus 102 receives the job transmitted from the information processing apparatus 105, it is determined whether or not the job is a job that causes the image processing apparatus 101 to return to the standby state 5402 (S51001). Specifically, in a case where the job transmitted from the information processing apparatus 105 is the print job, the CPU 201 determines as the job that causes the image processing apparatus 101 to return to the standby state 5402. This print job is a job where the RIP process is conducted in the printing control apparatus 102 and also the RIP processed data is printed in the image processing apparatus 101.

In a case where the job transmitted from the information processing apparatus 105 is a hold job, the CPU 201 determines as a job that does not cause the image processing apparatus 101 to return to the standby state 5402. This hold job is a job where up to the RIP process is conducted in the printing control apparatus 102 but the printing is not automatically executed in the image processing apparatus 101. In addition, in a case where a job for reading the MIB related only to the printing control apparatus 102 or editing the print job on the printing control apparatus 102 is received, the CPU 201 does not cause the image processing apparatus 101 to return to the power saving state 5404.

When the CPU 201 determines in S5803 that the received job is a job that does not cause the image processing apparatus

101 to return to the standby state (S51001: No), the process is ended while the image processing apparatus 101 is not caused to return to the standby state 5402.

On the other hand, when the CPU 201 determines that the received job is a job that causes the image processing apparatus 101 to return to the standby state (S51001: Yes), the CPU 201 causes the network I/F unit 205 to transmit an activation instruction command (S51002). After the activation instruction command is transmitted to the image processing apparatus 101, the CPU 201 waits for a response from the image processing apparatus 101. The CPU 201 then determines whether or not the activation notification command is received from the image processing apparatus 101 (S51003). In a case where the CPU 201 determines that the activation notification command is received (S51003: Yes), the CPU 201 causes the network I/F unit 205 to transmit the device state request packet (S51004). The CPU 201 determines whether or not the packet indicating the state of the image processing apparatus 101 is received from the image processing apparatus 101 (S51005). When it is determined that the packet indicating the state of the image processing apparatus 101 is received (S51005: Yes), the state of the image processing apparatus 101 is saved in the RAM 204 or the HDD 310 (S51006). The RAM 204 or the HDD 310 stores the sheet information of the sheet tray (the sheet type, the size, or the remaining number of sheets) or the like as the state of the image processing apparatus 101 immediately after returning to the power saving state 5404. Subsequently, the CPU 201 controls the network I/F unit 205 so that the communication between the printing control apparatus 102 and the image processing apparatus 101 is resumed (S51007). Specifically, the CPU 201 controls the network I/F unit 205 so that the printing control apparatus 102 periodically (for example, a 60-second interval) obtains the MIB (Management Information Base) of the image processing apparatus 101 by way of polling.

In S51005, in a case where the CPU 201 does not obtain the packet indicating the state of the image processing apparatus 101 during a period until the predetermined time has elapsed after the device state request packet is transmitted (S51008), the flow proceeds to S51007. At this time, the CPU 201 does not save the state immediately after the image processing apparatus 101 returns from the power saving state 5404.

In S51003, in a case where the CPU 201 does not determine the activation notification command is received (S51003: No), the CPU 201 transmits the activation notification command by a predetermined number of times (S51009: Yes). After the activation notification command is transmitted by the predetermined number of times or the activation notification command is not received from the image processing apparatus 101, the flow proceeds to S51004 (S51009: No).

Figure 4G:
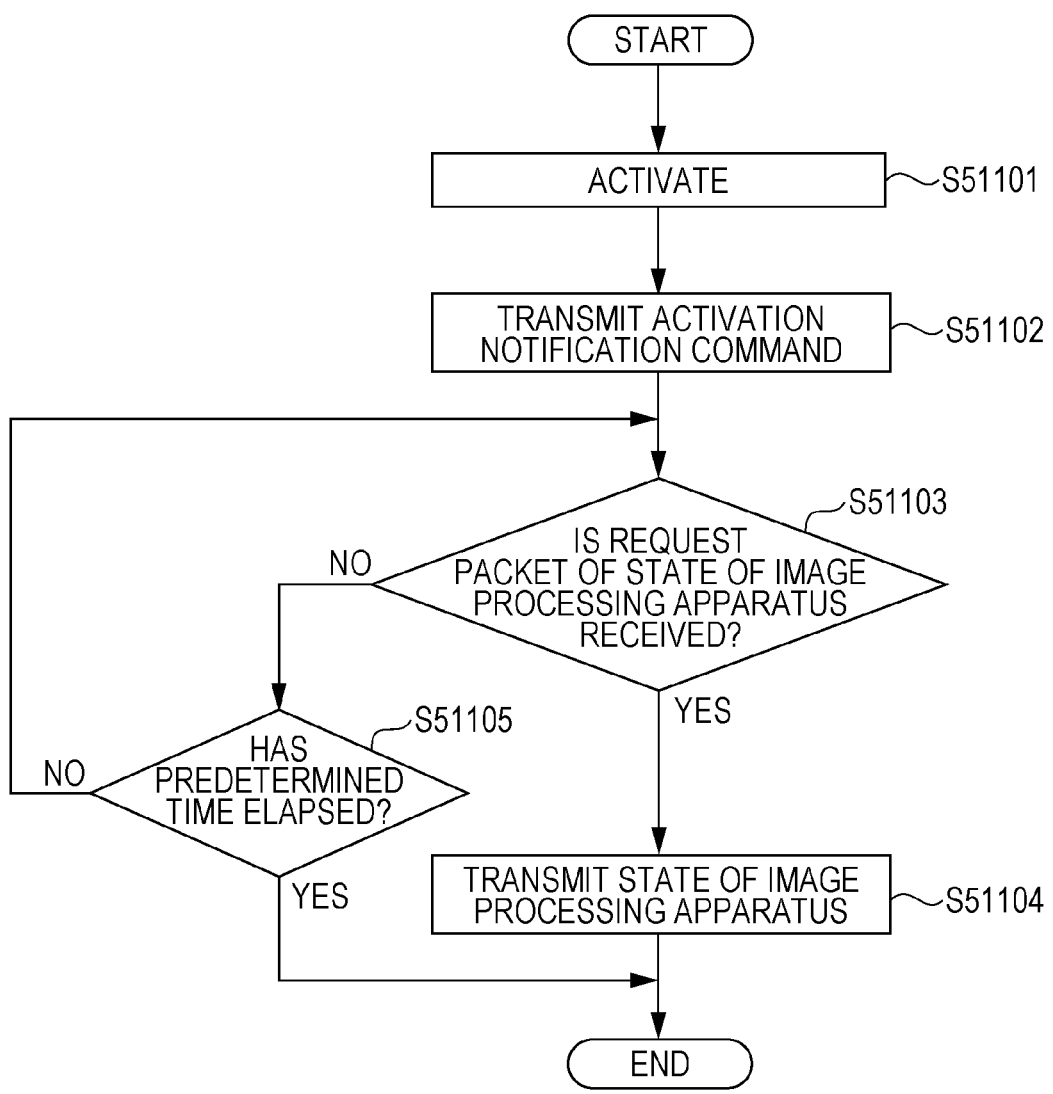
FIG. 4G is a flow chart for describing the control method for the image processing apparatus.

Operation by the Image Processing Apparatus in a Case where the Sleep Return Factor Exists on the Printing Control Apparatus Side FIG. 4G is a flow chart for the image processing apparatus 101 in a case where the image processing apparatus 101 is subjected to the sleep return from the side of the printing control apparatus 102. With reference to FIG. 4G, the description will be given of the operation by the image processing apparatus 101 in a case where the image processing apparatus 101 returns from the power saving state 5404 to the standby state 5402 from the printing control apparatus 102 side.

The power supply is stopped with respect to the CPU 301 in the image processing apparatus 101 in the power saving state 5404, but the power is supplied to the network I/F 302. When the activation instruction command transmitted in S5903 by the network I/F 302 is received, the power supply control unit 307 turns on the relay so that the power is supplied to the CPU 301 and the like. According to this, the image processing apparatus 101 returns from the power saving state 5404 to the standby state 5402. The CPU 301 that has been supplied with the power executes the process while following the flow chart of FIG. 4G by executing the program expanded into the RAM 304.

The CPU 301 that has been supplied with the power first performs the activation process (S51101). In this the activation process, the image processing apparatus 101 is put back in a state before being shifted to the power saving state 5404 by using the state of the image processing apparatus 101 saved in the RAM 304. The CPU 301 then causes the network I/F 302 to transmit the activation notification command (S51102). After that, the CPU 301 determines whether or not the obtaining request packet of the state of the image processing apparatus 101 is received from the printing control apparatus 102 (S51103). In a case where the CPU 301 determines that the obtaining request packet is received (S51103: Yes), the CPU 301 generates a packet indicating the state of the image processing apparatus 101 and causes the network I/F 302 to transmit the generated packet (S51104).

When the CPU 301 determines in S51103 that the obtaining request packet is not received (S51103: No), it is determined whether or not a predetermined time has elapsed after the activation notification command is transmitted (S51105). The CPU 301 stands by for the predetermined time until the obtaining request packet is received (S51105). In a case where the CPU 301 does not receive the obtaining request packet even when the CPU 301 stands by for the predetermined time (S51105: Yes), the process is ended without transmitting the state of the image processing apparatus 101.

Regarding a Query from a Client Computer

Information related to the image processing apparatus 101 can be obtained with a job management tool that displays, edits, and prints the print job saved in the printing control apparatus 102 from the information processing apparatus 105. In a case where a setting on a sheet tray of the image processing apparatus 101 is made or the remaining number of sheets is confirmed by the job management tool when the image processing apparatus 101 is in the power saving state 5404, the printing control apparatus 102 does not make a query to the image processing apparatus 101. The printing control apparatus 102 transmits the information of the image processing apparatus 101 obtained immediately before being shifted to the power saving state to the job management tool (S5705 to S5707). According to this, the job management tool (the information processing apparatus 105) displays the state of the image processing apparatus 101.

A printer driver installed into the information processing apparatus 105 has a bidirectional communication function for obtaining a device configuration of an accessory of the image processing apparatus 101 and sheet information. Similarly as described above, the printing control apparatus 102 in the power saving state 5404 does not make a query to the image processing apparatus 101, and the information of the image processing apparatus 101 obtained immediately before being shifted to the power saving state is transmitted (S5705 to S5707). However, in a case where the information of the image processing apparatus 101 obtained immediately before being shifted to the power saving state 5404 is updated, the printing control apparatus 102 causes the image processing apparatus 101 to return from the power saving state 5404 to the standby state 5402 to update the information.

Effects of the Present Embodiment

According to the present embodiment, the image processing apparatus 101 causes the printing control apparatus 102 to stop regularly obtaining the MIB of the image processing apparatus 101 before the image processing apparatus 101 is shifted to the power saving state 5404. After the printing control apparatus 102 stops regularly obtaining the MIB of the image processing apparatus 101, the image processing apparatus 101 is shifted from the standby state 5402 to the power saving state 5404. According to this, the image processing apparatus 101 does not return from the power saving state 5404 to the standby state 5402 through the regular obtainment of the MIB by the printing control apparatus 102. Therefore, it is possible to realize the power saving in the image processing apparatus 101.

FIG. 5 is a flow chart for describing a sleep mode shift process of the printing system according to the present embodiment. The present example illustrates a sequence example during a period in which the printing control apparatus 102 accepts the print instruction from the information processing apparatus 105 illustrated in FIG. 1 until and the image processing apparatus 101 is shifted to the sleep state after the end of the printing process by the image processing apparatus 101. T0 to T7 denote respective steps.

In FIG. 5, the printing control apparatus 102 receives the print job from the information processing apparatus 105 (T0). The RIP unit 207 of the printing control apparatus 102 performs the RIP process on the received job and transmits the job after the RIP process to the image processing apparatus 101 via the network I/F unit 205 after the completion (T1).

The printing control apparatus 102 notifies the image processing apparatus 101 of an active state after the job is transmitted (T2). While the image processing apparatus 101 is notified of the active state, the image processing apparatus 101 is not shifted to the sleep mode. The image processing apparatus 101 is notified of this notification on the active state from the printing control apparatus 102 regularly or when the state is changed. The image processing apparatus 101 notifies the printing control apparatus 102 of the printing process start after the job is received and starts the printing process.

After the printing process by the image processing apparatus 101 is completed, the image processing apparatus 101 notifies the printing control apparatus 102 of the printing completion (T3). The printing control apparatus 102 receives a printing completion notification from the image processing apparatus 101 and notifies the image processing apparatus 101 of the non-active state (IDLE state) (T4).

In a case where this non-active state continues until the elapsed time of a previously set sleep mode shift time, and the sleep mode shift can be conducted, the image processing apparatus 101 notifies the printing control apparatus 102 of a sleep preparation start (T5). The printing control apparatus 102 accepts the sleep preparation start notification and performs a process for the sleep shift. The printing control apparatus 102 notifies the image processing apparatus 101 of a completion of the sleep shift preparation process (T6). The image processing apparatus 101 accepts the sleep preparation completion notification and is shifted to the sleep mode (T7).

FIG. 6 is a flow chart illustrating the control method for the printing control apparatus according to the present embodiment. A program of the printing control apparatus 102 related to the present flow is stored in the RAM 204 of the printing control apparatus 102 and is realized through the execution by the control unit (CPU) 201. Hereinafter, a description will be given of a series of the flow of the printing control apparatus 102 during a period when the printing control apparatus 102 receives the job until the image processing apparatus 101 is shifted to the sleep mode.

In S501, the job reception unit 202 of the printing control apparatus 102 receives a job from the information processing apparatus 105. In S502, the RIP unit 207 performs the RIP process, and the network I/F unit 205 transmits the job to the I/F unit 302 of the image processing apparatus 101. In S503, the network I/F unit 205 notifies the I/F unit 302 of the image processing apparatus 101 of the active state.

In S504, it is determined whether or not the job management unit 203 receives the notification of the printing start instruction from the image processing apparatus 101. When it is determined that the job management unit 203 receives the notification of the printing start instruction, the flow is shifted to S508. When it is determined that the job management unit 203 does not receive the notification of the printing start instruction, the flow is shifted to S505.

In S505, the job management unit 203 determines whether or not a previously set certain period of time has elapsed since the job is transmitted in S503 to the image processing apparatus 101. Here, in a case where the job management unit 203 determines that the certain period of time has elapsed, the flow is shifted to S506. In a case where the job management unit 203 determines that the certain period of time has not elapsed, the flow returns to S504. For this certain period of time, a time previously set by the user or a fixedly set time may also be used.

It is determined in S506 as to whether or not a type of the job a start instruction of which is not received from the image processing apparatus 101 within a predetermined time after the job management unit 203 transmits the job to the image processing apparatus 101 is a particular type of the job. Specifically, it is determined whether or not the job transmitted to the image forming apparatus 101 is either the secure job or the suspend job. In a case where the job management unit 203 determines that the transmitted job is either the secure job or the suspend job, the flow is shifted to S507. In a case where the job management unit 203 determines that the transmitted job is neither the secure job nor the suspend job, the flow returns to S504.

At this time, regarding the determination on the secure job, the printing is started only after a user authentication (password input or the like) is executed in the operation unit 306 of the image processing apparatus 101 in the secure job. For that reason, a state in which the printing start notification is not transmitted from the image processing apparatus 101 mentioned herein refers to a state in which the user authentication is not yet conducted and means a state in which the image processing apparatus 101 is not used.

In case of the suspend job, the job is kept to be stored in the printing queue of the printing control apparatus 102 when a sheet type used by the input job is not included among types of sheets set in a sheet feed apparatus of the image processing apparatus 101, and a sheet feed waiting state is established. Therefore, in a case where the suspend job is determined after a certain period of time has elapsed, this means that the state where the sheet used for the image processing apparatus 101 is not fed by the user and the image processing apparatus 101 is not used continues as it is. Therefore, according to the present embodiment, the image processing apparatus 101 can be shifted to the sleep mode by detecting the above-described job.

In S507, the RAM 204 stores the secure job or the suspend job in the printing queue in the above-described step in the standby queue of the RAM 204. In S509, the RAM 204 stores information on the job shifted to the standby queue (storage destination information). Herein, the storage destination information refers to the storage destination information on the job a storage destination is transferred. For example, in a case where the storage destination is transferred from the printing queue to the standby queue, the storage destination information corresponding to the standby queue is stored in the RAM 204 corresponding to a storage destination information storage unit.

In S508, it is determined whether or not the job management unit 203 receives the printing completion notification of the job where the printing has started from the image processing apparatus 101. At this time, in a case where the job management unit 203 determines that the printing completion notification is received, the flow is shifted to S510. On the other hand, in a case where the job management unit 203 determines the printing completion notification is not received, the flow returns to S508.

Next, in S510, the network I/F unit 205 notifies the image processing apparatus 101 of the non-active state, and the present process is ended. At this time, by notifying the image processing apparatus 101 of the non-active state, in a case where the set sleep mode shift time has elapsed, the image processing apparatus 101 can be shifted to the sleep mode by itself.

FIG. 7 is a flow chart illustrating the control method for the printing control apparatus according to the present embodiment. A program of the printing control apparatus 102 related to the present flow is stored in the RAM 204 of the printing control apparatus 102 and is realized through the execution by the control unit (CPU) 201. Hereinafter, a description will be given of a series of the flow of the printing control apparatus 102 during a period when the image processing apparatus 101 has returned until the secure job or the suspend job is subjected to the printing process.

In S601, the network I/F unit 205 of the printing control apparatus 102 receives a return notification from the sleep mode from the image processing apparatus 101. In S602, the job management unit 203 obtains the information on the job shifted to the standby queue stored in the RAM 204 in S609.

In S603, the job management unit 203 determines whether or not the secure job or the suspend job shifted to the standby queue exists on the basis of the job information shifted to the standby queue which has been obtained in the above-described step. In a case where the job management unit 203 determines that the job shifted to the standby queue exists, the flow is shifted to S608. The job management unit 203 determines that the job shifted to the standby queue does not exist, the flow progresses to S604. In S604, the display unit 208 of the printing control apparatus 102 notifies the user of the information on the job shifted to the standby queue.

In S605, it is determined whether or not the network I/F unit 205 receives a printing start notification of the job shifted to the standby queue from the image processing apparatus 101. In a case where a type of the job is the secure job, this means that the user performs the user authentication on the image processing apparatus 101, and the printing has started. Similarly, in a case where a type of the job is the suspend job, a state of the printing start is established since the sheet fed to the image processing apparatus 101 satisfies the sheet used for the suspended job. At this time, the network I/F unit 205 determines that the printing start notification does not exist, the flow returns to S605.

In S606, the job management unit 203 shifts the job the printing start notification of which has been transmitted, from the standby queue to the printing queue. In S607, it is determined whether or not the network I/F unit 205 receives the printing completion notification from the image processing apparatus 101. In a case where the network I/F unit 205 determines that the printing completion notification is received, the flow is shifted to S610. On the other hand, in a case where the network I/F unit 205 determines that the printing completion notification is not received, the flow returns to S607.

In S608, the job analysis unit 206 determines whether or not the information obtained in S602 from the standby queue is matched with the job stored in the standby queue. This is conducted for determining whether or not the secure job or the suspend job stored in the standby queue is deleted during the sleep mode of the image processing apparatus 101. In a case where the standby queue information is not matched with the job actually stored in the standby queue, it is determined that the job is deleted, and the flow is shifted to S609. On the other hand, when it is determined that the job is not deleted, the flow is shifted to S604.

In S609, the network I/F unit 205 performs a job deletion notification to the image processing apparatus 101 indicating that the secure job or the suspend job is deleted. In S610, the job management unit 203 shifts the job stored in the printing queue to the printed queue.

In S611, the job management unit 203 updates the standby queue storage information, and the present process is ended. If the job is deleted from the standby queue in S608, the relevant job is deleted from the standby queue storage information, and if the printing is completed in S607, the job is deleted from the standby queue information as the printing completed job.

FIG. 8 is a flow chart illustrating the control method for the image forming apparatus according to the present embodiment. The present example is a printing control process example by the image processing apparatus 101. A program of the image processing apparatus 101 related to the present flow is stored in the storage unit 304 of the image processing apparatus 101 and is realized through the execution by the control unit 301. Hereinafter, a description will be given of a series of the flow of the image processing apparatus 101 when the image processing apparatus 101 returns from the sleep mode.

In S701, the I/F unit 302 of the image processing apparatus 101 notifies the network I/F unit 205 of the printing control apparatus 102 that the image processing apparatus 101 returns from the sleep mode.

In S702, the I/F unit 302 determines whether or not a deletion notification of the secure job or the suspend job from the printing control apparatus 102 exists. In a case where the I/F unit 302 determines that the deletion notification exists, the flow is shifted to S703. On the other hand, in a case where the I/F unit 302 determines that the deletion notification does not exist, the flow is shifted to S704.

In S703, the control unit 301 deletes the secure job or the suspend job stored in the storage unit 304 in the image processing apparatus 101. The management state of the job stored in the standby queue of the printing control apparatus 102 is matched by deleting the image processing apparatus 101.

In S704, in case of the secure job, it is determined whether the control unit 301 performs the user authentication by using the operation unit 306. In a case where the control unit 301 determines that the user authentication is conducted, the flow is shifted to S705. In a case where the control unit 301 determines that the user authentication is not conducted, the flow returns to S704. On the other hand, in case of the suspend job, the control unit 301 determines whether or not a sheet used in the suspend job is fed among sheets fed to the sheet feeder stage. At this time, in a case where the control unit 301 determines that the sheet is fed, the flow is shifted to S705. In a case where the control unit 301 determines that the sheet is not fed, the flow returns to S704.

In S705, the I/F unit 302 notifies the printing control apparatus 102 that the printing of the job where the user authentication is conducted is started. In S706, the printing unit 303 executes the printing of the job. In S707, the I/F unit 302 notifies the printing control apparatus 102 that the printing of the job is completed, and the present process is ended.

Figure 9:
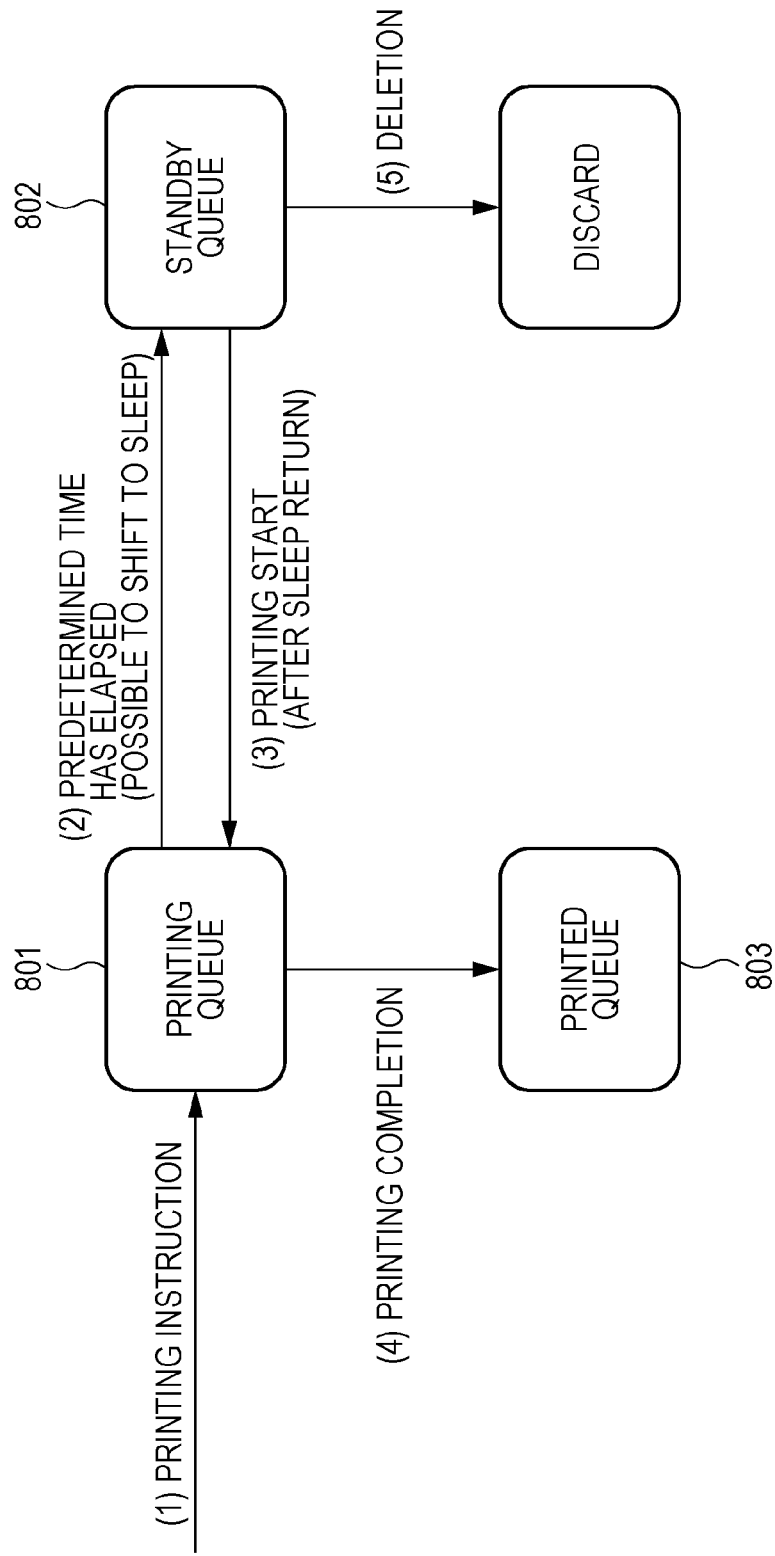
FIG. 9 is an explanatory diagram for describing a job process in the printing control apparatus.

FIG. 9 is an explanatory diagram for describing a job process in the printing control apparatus according to the present embodiment.

Hereinafter, a description will be given of a state of the query where the secure job or the suspend job is stored from a state in which the image processing apparatus 101 can be shifted to the sleep mode until the printing job is completed after the return from the sleep mode.

In FIG. 9, (1) the printing control apparatus 102 accepts the print instruction, and the job is stored in a printing queue (sent queue) 801. (2) The job is stored in the standby queue (job waiting queue) 802 in a case where a certain period of time has elapsed since the job is stored in the printing queue 801. (3) The printing of the job is started after the image processing apparatus 101 returns from the sleep mode, and the job is stored in the printing queue 801. (4) The printing of the job is completed, and the job is stored in a printed queue 803. (5) The job is discarded from the RAM 204 of the printing control apparatus 102 if the job is deleted while being stored in the standby queue 802. According to the present embodiment, the storage destinations associated with the job process states are allocated in the RAM 204, and the transfer control is executed by transferring the storage destination through the process based on the above-described flow chart.

FIG. 10 illustrates an example of list information of the jobs shifted to the standby queue stored in the RAM 204 of the printing control apparatus 102 according to the present embodiment.

In FIG. 10, in the present example, information on the standby queue shift time of the secure job or the suspend job shifted to the standby queue when the job is input to the printing queue and a certain period of time has elapsed while the printing is not started as well as information on the job type and the job name are held. The other job information can also be held as appropriate.

FIG. 11 illustrates an example of an UI screen displayed on the printing control apparatus according to the present embodiment. The present example illustrates an example of an UI screen where the display unit 208 of the printing control apparatus 102 notifies the user that the shifted job exists before the mode is shifted to the sleep mode when the image processing apparatus 101 returns from the sleep mode.

In FIG. 11, in the present example, it is notified that two jobs (the secure job that waits for the user authentication and the job suspended because of the media mismatch) are shifted to the standby queue. The user who has received this notification finds out that an unprocessed job remains since the image forming apparatus is shifted to the sleep mode.

Figure 12:
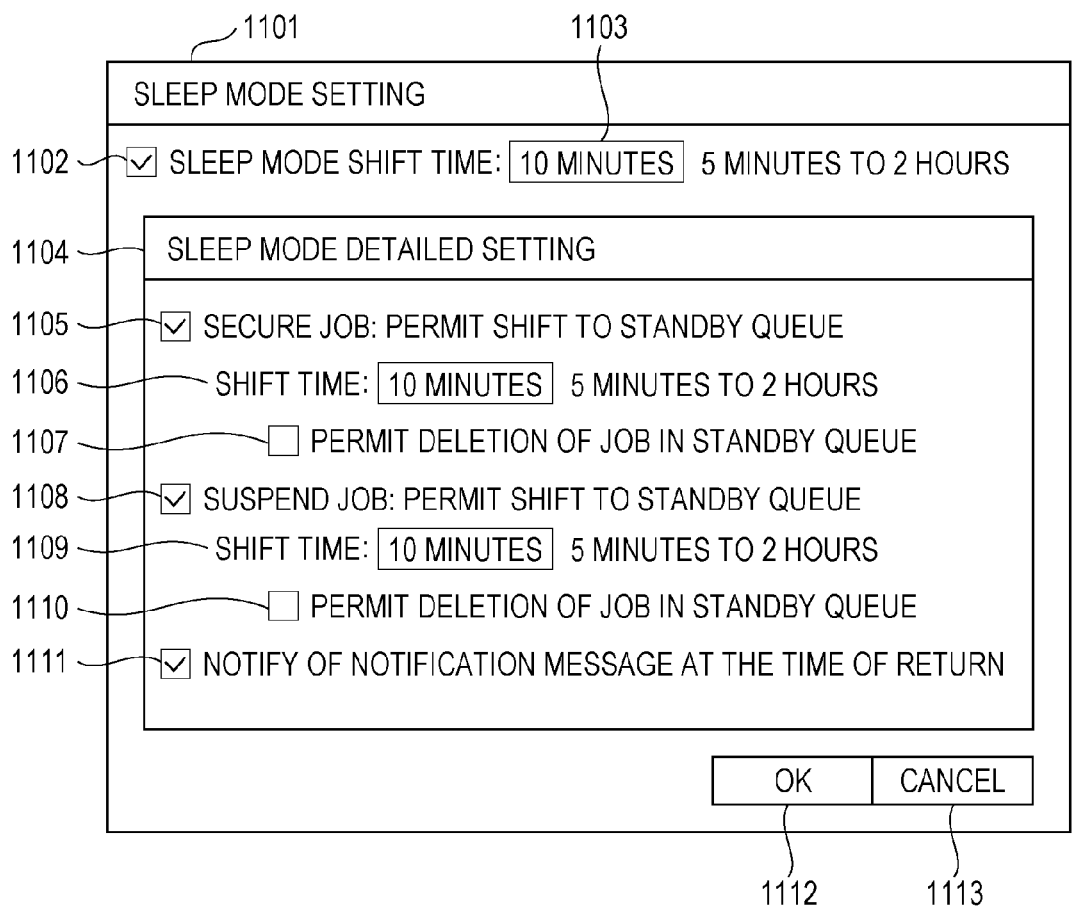
FIG. 12 illustrates an example of a UI screen displayed on the printing control apparatus or the image forming apparatus.

FIG. 12 illustrates an example of a UI screen displayed on the printing control apparatus or the image forming apparatus according to the present embodiment. The present example illustrates a screen display example of a sleep mode setting screen 1101 for setting the sleep mode with respect to the image processing apparatus 101, and a time when the transfer of the job waiting storage destination is allowed is set for each of particular types in the sleep mode detailed setting. The present setting is displayed on the display unit 305 of the image processing apparatus 101 or the display unit 208 of the printing control apparatus 102.

In FIG. 12, a setting on the sleep mode is set to be on by ticking a check box 1102. A setting 1103 on the sleep mode shift time can be made when the setting on the sleep mode is on. The image processing apparatus 101 shifts to the sleep mode in a case where a communication from an external device or a printing process instruction does not occur for a set certain period of time. A detailed setting 1104 relates to the sleep mode. A setting in accordance with the type of the job can be made in this sleep mode detailed setting.

A check box 1105 sets whether or not the secure job is in the printing queue and is permitted to be shifted to the standby queue in a case where the user authentication is not conducted and the print is not started for a certain period of time. A setting 1106 sets a time for the shift from the printing queue to the standby queue in a case where the shift to the standby queue is permitted in the check box 1105. After the set period of time has elapses, since the job is shifted to the standby queue, the use state of the printing control apparatus 102 is put in the non-active state, and the image processing apparatus 101 can start a count for the shift to the sleep mode.

In a check box 1107, whether or not the secure job shifted to the standby queue is deleted from the standby queue is set. A check is ticked in a case where the deletion is permitted.

A check box 1108 sets whether or not the shift to the standby queue is permitted in a case where the job suspended because of the sheet feed error without the sheet is in the printing queue, and the printing is not started since the sheet used for the job is not fed for a certain period of time. A setting 1109 sets a time for the shift from the printing queue to the standby queue in a case where the shift to the standby queue is permitted in the check box 1108. A check box 1110 sets whether or not the deletion of the suspend job shifted to the standby queue is permitted from the standby queue. The check box is ticked in a case where the deletion is permitted.

A check box 1111 sets whether or not a notification for the user that the job shifted to the standby queue exists in a case where the job shifted to the standby queue exists is permitted when the image processing apparatus 101 returns from the sleep mode. The notification illustrated in the example of FIG. 10 is made in a case where this notification setting is activated.

An OK button 1112 is pressed to validate the setting on the sleep mode setting screen 1101. A cancel button 1113 is pressed to invalidate the setting on the sleep mode setting screen 1101.

With this detail setting of the sleep mode, it is possible to set whether or not the shift to the standby queue is conducted and set a time until the shift is conducted in accordance with the use purpose of the user a state of a particular job such as the secure job or the suspend job.

In addition, by adopting a setting where the deletion of the secure job and the suspend job shifted to the standby queue is not permitted, a situation is avoided in which the job is deleted while the image processing apparatus 101 is shifted to the sleep mode. It is therefore possible to avoid the mismatch between the secure jobs or the suspend jobs transmitted to the image processing apparatus 101 to be stored and these jobs managed by the printing control apparatus 102 by avoiding the deletion of the job.

According to the present embodiment, the secure job and the suspend job are taken as the examples, but it is possible to apply the present invention to the other jobs impeditive to the shift to the sleep mode while a time has elapsed until the printing is started.

Second Embodiment

According to the present embodiment, to allow the image processing apparatus 101 to be effectively shifted to the sleep mode and to operate with the other printing functions without an adverse effect, it is determined whether or not the setting on the various functions and the shift time to the sleep mode are appropriate. For example, the function process including the time-out setting include a suspend mismatch function process, a cancel mismatch function process, and a sequential printing function process.

With the suspend mismatch function, the job remains in the printing queue as the sheet feed waiting state for a set certain period of time (time-out time) in a case where the printing is not started because the sheet used for the input job is not set in the sheet feeder stage. This is the function of leaving the job in the printing queue as the suspend job in a case where the time-out time has elapsed. With regard to the job stored in the printing queue as the suspend job after the time-out, the reprinting is not automatically conducted so long as the printing instruction is not issued by the user.

On the other hand, the cancel mismatch function is a function with which the job itself is left in the printing queue after the elapse of the time-out time instead of leaving the job in the printing queue as the suspend job, and the job is cancelled to be stored in the printed queue. The printing of the job once cancelled is not conducted so long as the reinstruction is not issued by the user.

In a case where these time-out setting times are longer than the sleep shift time, the image processing apparatus 101 is not shifted to the sleep mode even when the image processing apparatus 101 can enter the sleep state.

The sequential print is a function of guarantee a printing order. In a case where this function is activated, a same group ID is allocated to jobs input from a same client PC within a certain period of time (sequential time-out time). The printing order of the multiple jobs to which the same group ID is allocated is guaranteed. In a case where this sequential time-out time is longer than the sleep shift setting time, an input interval between a job and another job is increased while the user sequentially input the jobs within the time-out time, and the image processing apparatus 101 may be shifted to the sleep mode during this period.

At this time, in a case where the image processing apparatus 101 is shifted to the sleep mode, it may take time to return from the sleep mode of the image processing apparatus 101 before a next sequential job is input. A case occurs that the time-out time of the sequential print has elapsed during this return, and the same group ID is not allocated in the end. In such a case, the output products do not have the guarantee of the printing order of the multiple jobs originally guaranteed by the sequential print setting. For that reason, preferably, the image processing apparatus 101 does not enter the sleep mode during the sequential print to reliably output the products with the printing order guarantee of the jobs that have been input during the certain period of time.

To solve the above-described problem, according to the embodiment of the present invention, a set time for this sequential time-out is changed to the sleep mode shift time, so that the shift of the image processing apparatus 101 to the sleep mode during the input of the sequential job is avoided.

FIG. 13 is a flow chart for describing the control method for the printing control apparatus according to the present embodiment. In the present example, it is determined whether or not the sleep mode shift setting time of the image processing apparatus 101 is affected when the printing control apparatus 102 accepts time-out setting change notifications of the various functions, and the time-out setting time is changed. The program related to the present flow is stored in the RAM 204 of the printing control apparatus 102 and is realized through the execution by the control unit 201. Hereinafter, a description will be given of a process for an adjustment so that the time-out times associated with the suspend mismatch function process, the cancel mismatch function, the sequential printing function do not exceed the sleep mode shift setting time.

In S1201, the operation unit 209 of the printing control apparatus 102 receives the various time-out setting changes. In S1202, the setting management unit 211 obtains the time-out setting time set in S1201. In S1203, the setting management unit 211 obtains the sleep mode shift setting time set in the image processing apparatus 101.

In S1204, the setting management unit 211 compares the time-out setting time with the sleep mode shift setting time to determine whether or not the time-out setting time is longer than the sleep mode shift setting time. At this time, in a case where the setting management unit 211 determines that the time-out setting time is longer, the flow is shifted to S1205. On the other hand, in a case where the setting management unit 211 determines that the time-out setting time is shorter, and the present process is ended. On the other hand, also in a case where the shift to the sleep mode is not set, the process is ended.

In S1205, the setting management unit 211 sets the time-out time as a same time as the sleep mode to be stored in the RAM 204, and the present process is ended.

It is possible to realize both the sleep mode function and the printing function without adversely affecting the operation of the related art printing function also in the printing system where the sleep mode is set as described above.

The respective processes of the present invention can also be realized while a processing apparatus (a CPU or a processor) of a personal computer (computer) or the like executes software (program) obtained via a network or various storage media.

The present invention is not limited to the above-described embodiments. Various modifications (including organic combinations of the respective embodiments) can be made on the basis of the gist of the present invention and are not excluded from the scope of the present invention.

According to the embodiment of the present invention, even when the shift to the following state occurs that the printing control apparatus is not notified of the start of the job process for processing the particular type of the job, the relevant job can normally be resumed, and it is possible to promptly shift the image processing apparatus to the power saving state.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268361 filed Dec. 7, 2012, which is hereby incorporated by reference herein in its entirety.

What is claimed is:

1. A printing system comprising:
   a printing control apparatus configured to receive a print job transmitted from an external apparatus; and
   a printing apparatus configured to perform printing in accordance with the print job transmitted from the printing control apparatus,
   the printing control apparatus including
   a reception unit configured to receive the print job transmitted from the external apparatus,
   a first storage unit configured to store the print job received by the reception unit, and
   a transmission unit configured to transmit the print job stored in the first storage unit to the printing apparatus, and
   the printing apparatus including
   a reception unit configured to receive the print job transmitted by the transmission unit,
   a printing unit configured to perform printing in accordance with the print job received by the reception unit, and
   a notification unit configured to notify the printing control apparatus of a printing completion in a case where the printing unit completes the printing in accordance with the print job,
   wherein the transmission unit transmits information indicating that the printing apparatus is permitted to be shifted to a power saving state in a case where the notification of the printing completion is received from the notification unit, and
   wherein the printing apparatus further includes a control unit configured to shift the printing apparatus to the power saving state in a case where the information is received from the transmission unit.

2. The printing system according to claim 1,
   wherein the control unit restricts the printing apparatus to be shifted to the power saving state until the information is received from the transmission unit.

3. The printing system according to claim 1,
   wherein the information indicating that the printing apparatus is permitted to be shifted to the power saving state is information indicating that the printing control apparatus is in an IDLE state.

4. The printing system according to claim 3,
   wherein the control unit shifts the printing apparatus to the power saving state in a case where a predetermined time elapses while the printing control apparatus remains in the IDLE state.

5. The printing system according to claim 1,
   wherein the transmission unit transmits information indicating that the printing control apparatus is in an active state to the printing apparatus in a case where the print job is stored in the first storage unit, and
   wherein the control unit restricts the printing apparatus to be shifted to the power saving state in a case where the information indicating the printing control apparatus is in the active state is received.

6. The printing system according to claim 5,
   wherein the printing control apparatus further includes a storage unit configured to store the print job stored in the first storage unit in a second storage unit that is different from the first storage unit in a case where the notification of the printing completion is not received from the printing apparatus before a predetermined time has elapsed after the print job is transmitted to the printing apparatus,
   wherein the transmission unit does not transmit the information indicating that the printing control apparatus is in the active state to the printing apparatus in a case where the print job is stored in the second storage unit.

7. A printing control apparatus that transmits a received print job to a printing apparatus, the printing control apparatus comprising:
   a transmission unit configured to transmit the received print job to the printing apparatus;
   a notification unit configured to notify the printing apparatus that the print job is in an active state until the print job transmitted by the transmission unit is executed in the printing apparatus;
   a reception unit configured to receive a printing completion notification transmitted from the printing apparatus in a case where the print job transmitted by the transmission unit is executed in the printing apparatus; and
   a control unit configured to perform a control to cause the notification unit to stop notifying the printing apparatus that the print job is in the active state (A) in a case where the reception unit receives the printing completion notification or (B) in a case where a predetermined time elapses while the reception unit does not receive the printing completion notification after the transmission unit transmits the print job to the printing apparatus.

8. The printing control apparatus according to claim 7,
   wherein the printing apparatus notifies, in a case where the printing apparatus is shifted to a power saving state, the printing control apparatus of information indicating that the printing apparatus is shifted to the power saving state, and
   wherein the transmission unit transmits information indicating that a permission to be shifted to the power saving state to the printing apparatus in a case where the reception unit receives the information.

9. The printing control apparatus according to claim 7,
   wherein the printing apparatus is shifted to a power saving state while the print job is not in the active state as one of conditions.

10. The printing control apparatus according to claim 7,
    wherein the received print job is stored in a printing queue, and
    wherein the notification unit notifies the printing apparatus that the print job is in the active state in a case where the print job is stored in the printing queue.

11. The printing control apparatus according to claim 7,
    wherein the printing apparatus deletes the print job from a printing queue in a case where the print job is executed.

12. The printing control apparatus according to claim 7,
    wherein the print job is deleted from a printing queue in a case where a predetermined time elapses while the reception unit does not receive the printing completion notification.

13. The printing control apparatus according to claim 12, wherein the print job is deleted from a printing queue and the print job is stored in a holding queue in a case where the predetermined time elapses while the reception unit does not receive the printing completion notification.

* * * * *